US012711780B1

(12) United States Patent
Skibelid et al.

(10) Patent No.: US 12,711,780 B1
(45) Date of Patent: Aug. 18, 2026

(54) VEHICLE FOR, AND A METHOD OF, DETECTING FOREIGN OBJECT DEBRIS DISPOSED ON A RUNWAY OR TAXIWAY

(71) Applicant: Roboxi AS, Stavanger (NO)

(72) Inventors: Adrian Skibelid, Stavanger (NO); Markus Dørheim, Stavanger (NO); Torbjørn Bratland, Stavanger (NO)

(73) Assignee: ROBOXI AS (NO)

( * ) Notice: Subject to any disclaimer, the term of this patent is extended or adjusted under 35 U.S.C. 154(b) by 0 days.

(21) Appl. No.: 19/280,777

(22) Filed: Jul. 25, 2025

(51) Int. Cl.

| | |
|---|---|
| ***G06V 20/58*** | (2022.01) |
| ***G05D 1/689*** | (2024.01) |
| ***G06V 10/60*** | (2022.01) |
| *G05D 105/80* | (2024.01) |
| *G05D 107/80* | (2024.01) |

(Continued)

(52) U.S. Cl.
CPC ............. *G06V 20/58* (2022.01); *G05D 1/689* (2024.01); *G06V 10/60* (2022.01); *G05D 2105/80* (2024.01); *G05D 2107/85* (2024.01); *G05D 2109/10* (2024.01); *G05D 2111/10* (2024.01)

(58) Field of Classification Search
CPC ......... G01N 29/225; G01N 2291/0289; G01N 29/04; G01N 29/043; G01N 29/265; G01N 2291/0237; G01N 2291/02854; G01N 2291/106; G01N 2291/267; G01N 29/07; G01N 2291/2698; G01N 29/226; G01N 21/88; G01N 27/82; G01N 29/041; G01N 2291/0258; G01N 29/28; G01N 2291/044; G01N 2291/2694; G01N 29/221; G01N 29/223; G01N 29/2468; G01N 29/262; G01N 29/326; G01N 29/46; G01N 2291/2634; G01N 2291/011; G01N 2291/0231; G01N 2291/051; G01N 2291/2636; G01N 29/00; G01N 29/30; G01N 29/32
See application file for complete search history.

(56) References Cited

U.S. PATENT DOCUMENTS

| | | | | |
|---|---|---|---|---|
| 2015/0002745 A1* | 1/2015 | Bernal | .................. | G06V 20/54 348/575 |
| 2016/0182822 A1* | 6/2016 | Stankovic | .............. | G06T 7/215 348/36 |
| 2022/0144076 A1* | 5/2022 | Maddox | ................. | G01S 7/481 |

FOREIGN PATENT DOCUMENTS

| | | |
|---|---|---|
| WO | 2020109603 A1 | 6/2020 |

* cited by examiner

*Primary Examiner* — Alex Kok S Liew
(74) *Attorney, Agent, or Firm* — POLSINELLI PC

(57) ABSTRACT

A vehicle for detecting foreign object debris (FOD) disposed on a runway or taxiway, the vehicle comprising an array of forward-facing cameras configured to capture images of the runway or taxiway and transmit the images to FOD detection circuitry, each forwarding-facing camera being a camera oriented such that a respective dot product arising between the camera's optical axis and the forward direction is greater than zero, the array being arranged such that, when in use: a respective azimuthal angle arising between each forward-facing camera's optical axis and the forward direction does not exceed a limiting value, the azimuthal angle between an extremal forward-facing camera's optical axis and the forward direction being equal to the limiting value, and each forward-facing camera's imaging plane is positioned such that its displacement along the forward direction is at least a threshold distance away from its respective forward-facing camera.

20 Claims, 9 Drawing Sheets

(51) Int. Cl.

| | |
|---|---|
| *G05D 109/10* | (2024.01) |
| *G05D 111/10* | (2024.01) |

VEHICLE FOR, AND A METHOD OF, DETECTING FOREIGN OBJECT DEBRIS DISPOSED ON A RUNWAY OR TAXIWAY

FIELD OF THE INVENTION

The present invention relates to the field of runway/taxiway condition monitoring, and in particular to a vehicle for, and a method of, detecting foreign object debris disposed on a runway or taxiway.

BACKGROUND

Maintenance of airport runways and taxiways is a major safety concern in airport operations. The conditions of a runway must be closely monitored to ensure that pilots and air traffic control are kept informed of the current runway conditions and are able to make decisions and adjustments necessary for safe flight operation.

For example, when adverse meteorological conditions cause the runway surface to be wet or icy, a runway friction measurement must typically be carried out to advise pilots and air traffic control of the reduced control and braking power on the runway surface. Other runway conditions, such as runway visibility (RVR) and wind speeds must also be measured. Such measurements can be slow and labour-intensive.

A further safety concern is that of foreign object debris (FOD) on the surface of runways and taxiways. Objects on the ground surface, including debris from vehicles, broken equipment and in some cases animals such as birds and rodents, can adversely affect fast-moving aircraft. Taxiway and Runway FOD can cause many serious problems, such as tyre puncture, injury to personnel and path blockage. When ingested in a jet engine for example, FOD can cause serious and substantial damage, often leading to deadly engine failures. Foreign object damage is typically mitigated by performing regular and frequent inspection of the airfield by airport staff. In such inspection operations, vast areas across the runways and taxiways must be swept and closely inspected for FOD, which can often be a lengthy and laborious process, as the airfield must be physically traversed.

The deployment of airport staff to monitor runway and taxiway conditions, manually taking measurements and reporting back to air traffic control, is unreliable, expensive and time-consuming. The problem is exacerbated when adverse conditions on the runway or taxiway are discovered and maintenance staff, together with specialist maintenance equipment, has to be deployed.

A multi-functional module runway monitoring apparatus has been proposed in WO 2020/109603 A1. While the various sensors provided with the proposed apparatus go some way in addressing the aforementioned problems of monitoring FOD on a runway or taxiway, further improvements are needed to provide a more reliable FOD detection apparatus. For example, the quality of the images obtained from the cameras (that is, the visible light sensors of WO 2020/109603 A1) of the apparatus has a significant impact on the apparatus' ability to subsequently detect the presence and location of FOD on the runway or taxiway. As will be appreciated, if the image is too blurry (due to the relative motion between FOD and apparatus) and/or too dark (due to low light levels and/or the exposure time of the cameras), any subsequent post-processing of the images (using computer vision algorithms, for example), may result in false-positive FOD detection (where a runway marking or cat's eye may falsely be detected as a piece of FOD, for example) and/or false-negative FOD detection (where a piece of FOD is determined to be a cat's eye and so is not flagged, for example).

From the above, it will be appreciated that there is a need for a solution which allows FOD on runways and taxiways to be more reliably detected.

SUMMARY OF INVENTION

In a first aspect, there is provided a vehicle for detecting foreign object debris (FOD) disposed on a runway or taxiway, the vehicle being configured to travel along the runway or taxiway in a forward direction and comprising an array of forward-facing cameras configured to capture images of the runway or taxiway and transmit the images to FOD detection circuitry, each forwarding-facing camera being a camera oriented such that a respective dot product arising between the camera's optical axis and the forward direction is greater than zero, the array being arranged such that, when in use: the forward-facing cameras' fields of view combine to form a cumulative field of view which spans a width of a to-be-imaged part of the runway or taxiway, a respective azimuthal angle arising between each forward-facing camera's optical axis and the forward direction does not exceed a limiting value, the azimuthal angle between an extremal forward-facing camera's optical axis and the forward direction being equal to the limiting value, and each forward-facing camera's imaging plane is positioned such that its displacement along the forward direction is at least a threshold distance away from its respective forward-facing camera, the threshold distance being determined based on the width of the to-be-imaged part of the runway or taxiway, and the limiting value, the limiting value being determined based on the extremal forward-facing camera's exposure time, a length scale of the FOD to be detected by the extremal forward-facing camera, a maximum tolerable amount of captured motion blur, and the vehicle's velocity.

The vehicle may be a manned ground vehicle (such as a car, truck, lorry, or even an aeroplane when taxiing, for example) or an unmanned ground vehicle. An unmanned ground vehicle (UGV) may be thought of as a vehicle that operates while in contact with the ground (that is, a runway or taxiway) without an onboard human presence. UGVs may be beneficial in that they remove the need for humans to inspect a potentially hazardous environment in person. This way, FOD detection processes may be made safer.

The vehicle possesses an array of cameras, which are each configured to capture images of the runway or taxiway and transmit those images to FOD detection circuitry (which may be some processing circuitry executing a computer vision algorithm, for example). This FOD detection circuitry may subsequently detect any pieces of FOD within the images, and provide some alert to human inspectors so that the detected FOD may be removed from the runway or taxiway prior to the next take-off/landing of an aircraft.

Notably, the vehicle is operable to travel in a forward direction (among other directions such as reverse or turning directions such as left/anticlockwise and right/clockwise, for example). The inventors have discovered that, in order to reduce the amount of captured motion blur within the images, each camera of the array must be "forward-facing". This means that the optical axis of each camera forms an acute (or zero) azimuthal/yaw angle and an acute (or zero) elevation/pitch angle with the forward direction of the vehicle. For brevity's sake, it may be said that in order to be a "forward-facing" camera, said camera must be oriented so that the dot product arising between the camera's optical axis and the forward direction is greater than zero. Ideally, this dot product would be equal to one (that is, the optical axis and forward direction are parallel with each other), thereby minimising motion blur, as any FOD being imaged would be travelling in a direction perpendicular to the camera's imaging plane while the camera's shutter closes.

However, this ideal arrangement would lead to an array providing a narrow cumulative field of view, resulting in the vehicle having to perform several "sweeps" or passes along the length of the runway or taxiway in order to complete an FOD detection process, with each sweep only covering a narrow portion of the width of the runway or taxiway. Thus, in order to reduce the number of sweeps performed, and thus reduce the time taken to perform an FOD detection process, some of the forward-facing cameras in the array are oriented to form an acute azimuthal angle with the forward direction (instead of a zero azimuthal angle therewith), resulting in a cumulative field of view that spans a greater portion of the width of the runway or taxiway.

From the above, it will be appreciated that two conflicting requirements arise when arranging the vehicle's array of forward-facing cameras. Firstly, the azimuthal angle between each forward-facing camera's optical axis and the forward direction should be reduced so as to minimise motion blur (and thus make FOD detection more reliable), yet this same azimuthal angle should be increased so as to maximise the span/range of the array's cumulative field of view (and thus make FOD detection faster).

The inventors have discovered an arrangement which optimally satisfies both of these conflicting requirements. In particular, the inventors have found that the respective azimuthal angle between each forward-facing camera's optical axis and the forward direction must not exceed a "limiting value" so as to prevent the amount of captured motion blur from exceeding a maximum tolerable amount.

As will be appreciated, the array's cumulative field of view is made up of a combination of the forwarding-facing cameras' fields of view. As will be further appreciated, at least one of these fields of view span an outer extremal region (that is, a farthest left or right side) of the array's cumulative field of view. The forward-facing camera(s) whose field(s) of view spans the outer extremal region(s) is referred to as an extremal forward-facing camera.

Given this, the limiting value may be thought of as the azimuthal angle value arising between the extremal forward-facing camera's optical axis and the forward direction. When oriented at this limiting value, the extremal forward-facing camera is able to capture images of the outer extremal region with an amount of motion blur that is less than or equal to the maximum tolerable amount. As will be described later herein, the limiting value is determined using the extremal forward-facing camera's exposure time, a length scale of the FOD to be detected by the extremal forward-facing camera, a maximum tolerable amount of captured motion blur, and the vehicle's velocity.

Once this limiting value is determined, the width of the to-be-imaged part of the runway or taxiway (that is, the total span of the cumulative field of view) may be freely selected. Ensuring that the fields of view of each forward-facing camera combine to form the cumulative field of view having the selected total span then becomes a matter of distancing each field of view from its respective forward-facing camera by the appropriate amount.

In particular, once the total span of the cumulative field of view is selected, each forward-facing camera's imaging plane is positioned such that its displacement along the forward direction is at least a threshold distance away from its respective forward-facing camera. Given the constraint of the limiting value, this threshold distance ensures that the imaging planes of the forward-facing cameras span the width of the to-be-imaged part of the runway or taxiway, and so ensures that the fields of view combine to form the cumulative field of view having the selected total span. As will be described below, this threshold distance may be determined using the width of the to-be-imaged part of the runway or taxiway and the limiting value.

From the above, it will be appreciated that embodiments of the present invention provide means for carrying out a safe, fast and reliable FOD detection along a runway or taxiway-safe in that humans do not need perform in-person visual inspections of the runway or taxiway, and fast and reliable in that the vehicle's array is arranged so as to minimise the number of sweeps performed, and minimise the motion blur captured in images taken, during the FOD detection process.

Optionally, the limiting value may be determined based on the extremal forward-facing camera's field of view. This to say that the extremal forward-facing camera's field of view may additionally be taken into consideration when determining the limiting value. As will be appreciated, the greatest amount of motion blur may likely occur at the edges of the image frame. As will be further appreciated, this effect may be exaggerated when using increasingly larger fields of view-images taken with fish-eye lens typically exhibit the largest degree of motion blur at the edges of the image. Therefore, by taking field of view into account when determining the limiting angle value, the likelihood/frequency of captured motion blur surpassing the maximum tolerable amount may be reduced.

Optionally, the threshold distance may be determined based on the extremal forward-facing camera's field of view. This way, the total span of the cumulative field of view is treated as lying between the outer edges of the extremal forward-facing cameras' fields of view (from the left edge of the farthest left camera's field of view to the right edge of the farthest right camera's field of view, for example). This provides a more accurate modelling of the cumulative field of view when determining the threshold distance.

Preferably, the limiting value may be determined based on the extremal forward-facing camera's aperture size, and the illuminance of the FOD to be detected by the extremal forward-facing camera. This is to say that the extremal forward-facing camera's aperture size and the FOD's illuminance may additionally be taken into consideration when determining the limiting value. As will be appreciated, light levels change during the course of a day (with sunrise and sunset typically being darker than noon time, for example). Given this, a specified exposure time may provide an optimally exposed image at a first time in the day, and an underexposed image at a second time of the day. At the second time of the day, this underexposure may lead to less reliable FOD detection. To increase exposure levels, the aperture size may be increased so as to let more light onto the camera's sensor. This, however, reduces the depth of field of the camera, which may also lead to less reliable FOD detection if the FOD in question is captured in the out-of-focus (that is, blurry) region of the image. By additionally taking into account the illuminance of (that is, the amount of light reflected from) the FOD and the extremal forward-facing camera's aperture size, a limiting value may be found which, for the camera's exposure time and aperture size, provides optimal exposure for the extremal forward-facing camera's sensor while minimising both the amount of motion blur and the size of out-of-focus regions in the image.

More preferably, the limiting value may be determined based on the illuminance of the runway or taxiway. This is to say that the illuminance of the runway or taxiway may additionally be taken into account when determining the limiting value. As will be appreciated, the FOD to be detected is typically much smaller than the size of the runway or taxiway (which may occupy the majority/entirety of the image frame). As such, adjusting the aperture size of the extremal forward-facing camera may result in a less reliable FOD detection, as the camera's sensor is adjusted to that only a small portion of it is optimally exposed (to light reflected from a small piece of FOD, for example) given the exposure time, with the remainder of the sensor being under-/over-exposed. Therefore, it may be more beneficial to consider the difference in illuminance of (that is, the contrast between) the FOD and the runway or taxiway when determining aperture size, as a greater portion of the camera's sensor may be (more) optimally exposed (to light reflected from the imaged portion of the runway or taxiway, for example) given the exposure time. Preferably, the array may be arranged such that, when in use, a respective height of each forward-facing camera's principal point from the runway or taxiway is substantially half of a height of the forward-facing camera's imaging plane. As will be appreciated, the principal point is the point where the optical axis and imaging plane intersect, which is typically the centre of the imaging plane. By ensuring that the height of the principal point from the runway or taxiway is half the height of the imaging plane, the bottom edge of the imaging plane may be made to coincide with the surface of the runway or taxiway. This way, if a piece of FOD enters the field of view of the forward-facing camera, then its distance away from the forward-facing camera is greater than or equal to the distance between the forward-facing camera and its respective imaging plane. This helps to reduce any elevation-wise motion blur in the captured images, just like how the limiting value helps to reduce any azimuth-wise motion blur in the captured images.

Preferably, each forward-facing camera may be mounted to the vehicle such that the forward-facing camera's orientation with respect to the vehicle is rigidly fixed. Given that the vehicle is in motion when the forward-facing cameras are capturing images, relatively short exposure times are likely to be used by the forward-facing cameras. Given these short exposure times, any motion blur due to vehicle vibration (as it travels along the runway or taxiway) is likely to be negligibly small. As such, the array may be rigidly fixed to the vehicle without any intervening suspension system (such as, shock absorbers, springs, tuned masses, gimbals, and the like). This would therefore provide a lighter (and thus a faster and more manoeuvrable) vehicle, and also simplify its manufacture.

Optionally, the vehicle may comprise one or more damping pads between the forward-facing cameras and the vehicle. In low light conditions (at sunrise and sunset, for example), longer exposure times are likely to be used by the forward-facing cameras (to ensure that the images are not underexposed-underexposure may lead to less reliable FOD detection). Given these longer exposure times, any motion blur due to vehicle vibration (as it travels along the runway or taxiway) is likely to be sufficient enough to impact the reliability of FOD detection. By providing damping pads (such as rubber feet, for example) between the array and the vehicle, the vibrations may be damped to negligible levels. The damping pads are also advantageous in that they are less complex to install than whole suspension systems.

Preferably, each forward-facing camera may be a high-speed camera. Given that the forward-facing cameras will be capturing images while the vehicle is in motion, the exposure time of the cameras should be short so as to reduce the amount of motion blur in the captured images, thereby improving the reliability of FOD detection. High-speed cameras are capable of providing such short exposure times due to their typically faster shutter speeds compared with more commercially available cameras used by photographers.

More preferably, at least one of the high-speed cameras' exposure times may be configurable within a predefined range of exposure times. This is to say, that the exposure time of the high-speed camera(s) may be adjusted (by a human or by a processor executing suitable software instructions, for example) so as to take into account factors such as light levels (which change during the course of a day) or the vehicle's velocity (the vehicle may travel faster on certain runways/taxiways due to time requirements, surface smoothness, and the like).

Preferably, and regardless of whether the exposure time of the high-speed camera(s) is configurable/adjustable, a minimum exposure time of each high-speed camera does not exceed 0.001 seconds. A high-speed camera is typically defined as having an exposure time of less than or equal to 0.001 seconds.

Preferably, at least one of the forward-facing cameras' frame rates may be configurable within a predefined range of frame rates. This is to say, that the frame rate of the forward-facing camera(s) may be adjusted (by a human or by a processor executing suitable software instructions, for example) so as to take into account the vehicle's velocity (the vehicle may travel faster on certain runways/taxiways due to time requirements, surface smoothness, and the like).

More preferably, the frame rate of the at least one forward-facing camera may be configured such that, while the FOD lies within the forward-facing camera's field of view, the forward-facing camera captures at least three consecutive image frames depicting the FOD. This way, the FOD may be imaged enough times so as to be reliably detected by the FOD detection circuitry.

Preferably, the length scale of the FOD to be detected by the extremal forward-facing camera may be greater than or equal to one centimetre. This way, a wide range of FOD may be detected, even down to the scale of small vehicle parts (such as nuts and bolts, for example).

Preferably, the maximum amount of captured motion blur may represent a ratio of a maximum allowable intra-frame displacement of the foreign object debris and an intra-frame length scale of the FOD. This ratio is beneficial in that it enables the extent/amount of captured motion blur to be quantified, thereby enabling a more accurate determination of the limiting value and threshold distance.

More preferably, the ratio may not exceed 0.2. This is to say that the maximum tolerable amount of captured motion blur may be 20% of the inter-frame length scale of the FOD, or less. This way, the reliability of FOD detection may be improved, as the extent of tolerable motion blur is not so much as to cause false-positive or false-negative FOD detection.

Preferably, the width of the to-be-imaged part of the runway or taxiway may be greater than or equal to half of the width of the runway or taxiway. This way, the vehicle may complete an FOD detection process in two "sweeps" of the runway or taxiway-a first sweep being when the vehicle travels in a first direction within a first half of runway's or taxiway's width (a left half, as viewed along the first direction, for example), and a second sweep being when the vehicle travels in a second direction (substantially opposite the first direction) within a second half of runway's or taxiway's width (a right half, as viewed along the first direction, for example).

Optionally, when in use, the vehicle's velocity may be greater than or equal to 40 kilometres per hour. This way, carrying out the FOD detection process using the vehicle may take less time than using a human inspector (such as airport staff).

Preferably, when in use, the vehicle's velocity may be 60 kilometres per hour. The inventors have found that this velocity provides an optimal balance between speed and reliability of the FOD detection process.

Preferably, the threshold distance may be greater than or equal to 10 metres. The inventors have surprisingly found that a threshold distance of 10 metres or greater significantly reduces the likelihood/frequency/occurrence of false-positive FOD detection.

Preferably, the vehicle may comprise a set of driving cameras configured to capture images for unmanned driving of the vehicle; and one or more suspension systems coupled between the set of driving cameras and the vehicle. While the array of forward-facing cameras captures and transmits images to the FOD detection circuitry, the set of driving cameras may be thought of as cameras which configured to capture images of the runway or taxiway and transmit the images to a remote human operator or to autonomous driving circuitry. The driving cameras may use longer exposure times than the forward-facing cameras, as the images captured by the driving cameras are not being used to detect small pieces of FOD. Given these longer exposure times, any motion blur due to vehicle vibration (as it travels along the runway or taxiway) is likely to be sufficient enough to impact unmanned driving of the vehicle (a human may find it hard to judge the relative distance between the vehicle and the edge of the runway, for example). By providing suspension systems (such as, shock absorbers, springs, tuned masses, gimbals, and the like) between the set of driving cameras and the vehicle, the vibrations may be damped.

Preferably, the vehicle may be remotely operated or may be autonomous. Either way, the vehicle preferably should not require an onboard human operator, thereby removing the need for humans to inspect a potentially hazardous environment in person. In any case, the extra weight of a human operator would slow the vehicle down, making the FOD detection process longer.

Optionally, the vehicle may comprise a set of forward-facing light emitting elements. These light emitting elements (such as LEDs, fluorescent/incandescent bulbs, and the like) may increase the amount of light incident on the runway or taxiway, thereby enabling shorter exposure times to be used by the forward-facing cameras, and thus ensuring that motion blur (due to relative motion between the FOD and vehicle and/or due to vehicle vibration) are kept at negligible levels.

Optionally, the vehicle may comprise the FOD detection circuitry. This way, the time period between capturing an image of a piece of FOD and subsequently detecting the piece of FOD may be reduced, as the image is not being transmitted long distances to a server via wireless communication, but rather is being sent to the vehicle's onboard processing circuitry. In other words, the lag time (or ping) associated with transmitting images from the forward-facing cameras to the FOD detection circuitry may be reduced.

It will be appreciated that while the embodiments of the first aspect focus on the runway/taxiway of an airport, the vehicle may additionally be suitable for detecting FOD disposed on other regions of the airport, such as aprons, hangars, stop-ways, and the like, for example. In such cases, rather than having the cumulative field of view (of the array of forward-facing cameras) span a width of a to-be-imaged part of the runway or taxiway, it may instead span a width of a to-be-imaged part of the apron, hangar or stop-way (when FOD is to be detected in such regions).

Additionally, while the embodiments of the first aspect focus on FOD detection, other types of detection are possible. For example, the vehicle may be used to detect ground lighting (such as cat's eyes) and surface cracks in the runway/taxiway/apron. By taking into account the length scale of FOD when arranging the array of forward-facing cameras, the vehicle would likely be also suitable for detecting ground lights and surface cracks, given that the length scale of FOD is likely to be smaller than that of ground lights and surface cracks.

In a second aspect, there is provided a method of detecting foreign object debris (FOD) disposed on a runway or taxiway, comprising the steps of: obtaining a vehicle according to (any implementation of) the first aspect; obtaining FOD detection circuitry; controlling the vehicle to travel along the runway or taxiway in a first forward direction from a first location to a second location; while the vehicle is travelling in the first forward direction, controlling each of the forward-facing cameras to capture images of the runway or taxiway and transmit the images to the FOD detection circuitry; controlling the vehicle to travel along the runway or taxiway in a second forward direction from a third location to a fourth location, the second forward direction being substantially opposite the first forward direction; and while the vehicle is travelling in the second forward direction, controlling each of the forward-facing cameras to capture images of the runway or taxiway and transmit the images to the FOD detection circuitry.

In this method, the vehicle is made to perform at least two "sweeps" the runway or taxiway-a first sweep being when the vehicle travels in a first direction from a first location to a second location (a left half of the runway or taxiway, as viewed along the first direction, for example), and a second sweep being when the vehicle travels in a second direction (substantially opposite the first direction) from third location to a fourth location (a right half of the runway or taxiway, as viewed along the first direction, for example). As mentioned previously, to perform this FOD detection method with only two sweeps, the width of the to-be-imaged part of the runway or taxiway (that is, the total span of the array's cumulative field of view) may be greater than or equal to half of the width of the runway or taxiway. Should the total span be less than half of the width of the runway or taxiway, then additional sweeps may be required. For example, a third sweep may be used, in which vehicle travels in the first direction from a fifth location to a sixth location, and so on. The FOD detection method may therefore be thought of as sending the vehicle up and down the runway or taxiway in a snaking pattern of two or more "sweeps" to image the runway or taxiway, the captured images being sent to the FOD detection circuitry.

Preferably, the vehicle's velocity may be greater than or equal to 40 kilometres per hour when travelling from the first location to the second location and when travelling from the third location to the fourth location. This way, carrying out the FOD detection method of the second aspect may take less time than using a human inspector (such as airport staff).

More preferably, the vehicle's velocity may be 60 kilometres per hour when travelling from the first location to the second location and when travelling from the third location to the fourth location. The inventors have found that this velocity provides an optimal balance between the speed and reliability of the FOD detection method of the second aspect.

In a third aspect, there is provided a computer program comprising processor-implementable instructions which, when executed by a processor, cause the processor to: control a vehicle according to (any implementation of) the first aspect to travel along the runway or taxiway in a first forward direction from a first location to a second location; while the vehicle is travelling in the first forward direction, control each of the forward-facing cameras to capture images of the runway or taxiway and transmit the images to the FOD detection circuitry; control the vehicle to travel along the runway or taxiway in a second forward direction from a third location to a fourth location, the second forward direction being substantially opposite the first forward direction; and while the vehicle is travelling in the second forward direction, control each of the forward-facing cameras to capture images of the runway or taxiway and transmit the images to the FOD detection circuitry.

As mentioned previously, vehicle may be remotely operated, or may be autonomously controlled. In the latter case, once the vehicle and FOD detection circuitry are obtained, the remaining steps of the method of (any implantation of) the second aspect may be carried out carried out on conventional hardware suitably adapted as applicable by software instruction (such as autonomous driving software).

In a fourth aspect, there is provided a non-transitory computer-readable storage medium having stored thereon the computer program according to the third aspect.

BRIEF DESCRIPTION OF DRAWINGS

Embodiments of the present invention will be described with reference to the accompanying Figures, in which.

DETAILED DESCRIPTION

A vehicle for, and a method of, detecting foreign object debris (FOD) disposed on a runway or taxiway are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Vehicle

Figure 1:
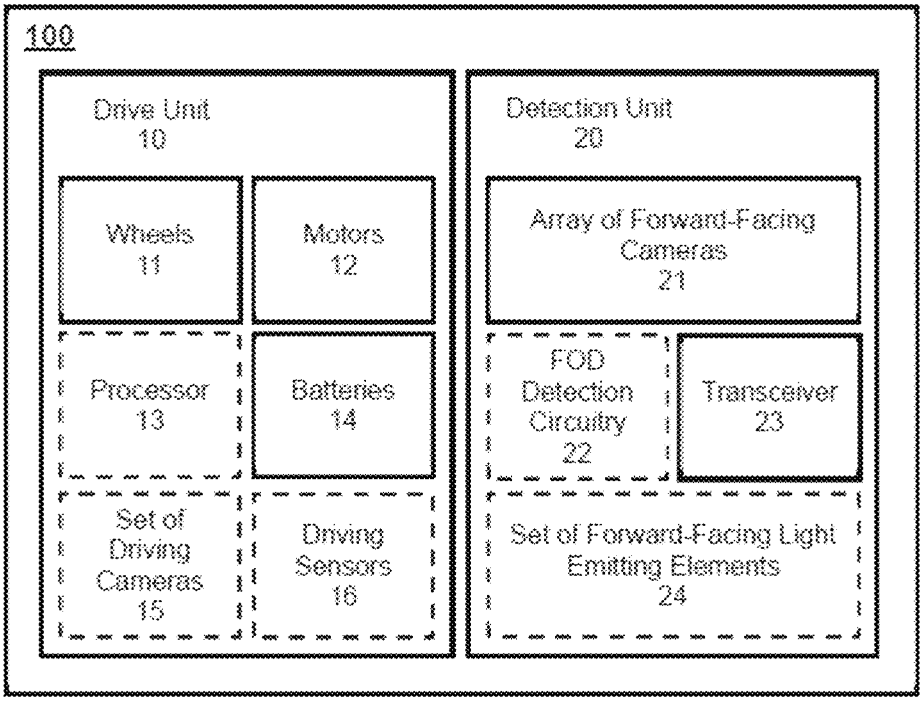
FIG. 1 schematically illustrates a vehicle according to embodiments of the present invention.

Turning now to FIG. 1, vehicle 100 comprises drive unit 10 and detection unit 20. As mentioned previously, vehicle 100 may be a manned ground vehicle operable by a human pilot/driver (a car, truck, lorry, or even an aeroplane when taxiing, for example). Alternatively, vehicle 100 may be an unmanned ground vehicle (UGV), which may be thought of as a vehicle that operates while in contact with the ground (that is, a runway or taxiway) without an onboard human presence. UGVs may be beneficial in that they remove the need for humans to inspect a potentially hazardous environment in person. This way, FOD detection processes may be made safer. The following description relates to a scenario where vehicle 100 is a UGV. This, however, is entirely non-limiting; the skilled person will appreciate that the techniques and methods discussed below may equally apply to a manned ground vehicle, mutatis mutandis.

Drive unit 10 comprises component parts for controlling vehicle 100 to travel along the runway or taxiway in a forward direction (among other directions such as reverse or turning directions such as left/anticlockwise and right/clockwise, for example). For example, the drive unit 10 may comprise a plurality of wheels 11, connected to one or more motors 12, which are powered by one or more batteries 14. The wheels 11 are typically placed at a lower side of the vehicle 100 and are made to contact the ground (that is, the runway or taxiway).

Optionally, drive unit 10 may comprise drive processor 13 configured to output a signal to the motors 12 to drive wheels 11. Drive processor 13 may be connected to a transceiver (such as transceiver 23 of detection unit 20, or a transceiver of drive unit 10) to receive and transmit drive data, such as route information, location information and data for remotely controlling vehicle 100. Additionally, drive unit 10 may comprise a stabilising mechanism (not shown) such as a variable suspension, so as to provide stability to the other components on-board vehicle 100 when it is travelling along the runway or taxiway.

Drive unit 10 may be manually operated from a remote server, to provide manual remote control over the position and movement of vehicle 100. Alternatively, drive unit 10 may be configured to operate autonomously. When operating autonomously, the motion of vehicle 100 due to drive unit 10 is dependent on a detected geography of the surroundings. As such, processor 13 of drive unit 10 may be connected to driving sensors 16 (discussed below), and may autonomously control vehicle 100 based on the data received from driving sensors 16.

Hence more generally, vehicle 100 may be remotely operated or may be autonomous. Either way, vehicle 100 preferably should not require an onboard human operator, thereby removing the need for humans to inspect a potentially hazardous environment in person. In any case, the extra weight of a human operator would slow vehicle 100 down, making the FOD detection process longer.

Drive unit 10 comprises one or more driving sensors 16 configured to detect one or more parameters of the ground surface. Driving sensors 16 may be any suitable sensors operable to facilitate safe autonomous navigation along a runway or taxiway. For example, driving sensors 16 may comprise a terrain sensor, operable to scan and detect terrain surrounding vehicle 100. The terrain sensor may comprise a LIDAR module, details of which are omitted here for brevity's sake—the skilled person knows how LiDAR modules work. Other examples of driving sensors 16 include sonar modules and radar modules, details of details of which are omitted here for brevity's sake—the skilled person knows how sonar and radar modules work.

Alternatively or in addition to driving sensors 16, vehicle 100 may comprise a set of driving cameras 15 configured to capture images for unmanned driving of vehicle 100. Driving cameras 15 may comprise an optical sensor arranged to capture a still or moving image of the surroundings. In an example, driving cameras 15 comprise a visible light camera, which provides visibility of the surroundings of vehicle 100. Driving cameras 15 may be arranged to capture images of the surrounding ground, and the images may be transmitted to processor 13, which may control motors 12 to drive wheels 11, and thereby autonomously control vehicle 100 in response to the imaged ground conditions.

Alternatively, images from driving cameras 15 may be transmitted (via transceiver 23) to a remote server. The remote server may perform remote autonomous control of vehicle 100, or may transmit the images as a live stream to a remote human operator in order that the operator may remotely control vehicle 100 in response to the imaged ground conditions. In any case, driving cameras 15 may be visible light sensors, infra-red sensors, and the like, or even combinations thereof.

From the above, it will be appreciated that driving cameras 15 may be thought of as cameras which are configured to capture images of the runway or taxiway and transmit the images to a remote human operator or to autonomous driving circuitry. As mentioned previously, driving cameras 15 may use longer exposure times than forward-facing cameras 21 (discussed later herein), as the images captured by driving cameras 15 are not being used to detect small pieces of FOD. Given these longer exposure times, any motion blur due to vehicle vibration (as it travels along the runway or taxiway) is likely to be sufficient enough to impact unmanned driving of vehicle 100 (a remote human operate may find it hard to judge the relative distance between vehicle 100 and the edge of the runway, for example).

As such, in embodiments where vehicle 100 comprises driving cameras 15, one or more suspension systems may be coupled between driving cameras 15 and vehicle 100. As mentioned previously drive unit 10 may comprise a stabilising mechanism (not shown) such as a variable suspension, so as to provide stability to the other components (such as driving cameras 15) on-board vehicle 100 when it is travelling along the runway or taxiway. By providing suspension systems/stabilising mechanisms (such as, shock absorbers, springs, tuned masses, and the like), the motion-induced vibrations may be damped.

Hence more generally, vehicle 100 may comprise a set of driving cameras 15 configured to capture images for unmanned (that is, remote controlled or autonomous) driving of vehicle 100; and one or more suspension systems coupled between the set of driving cameras 15 and vehicle 100.

Figure 2:
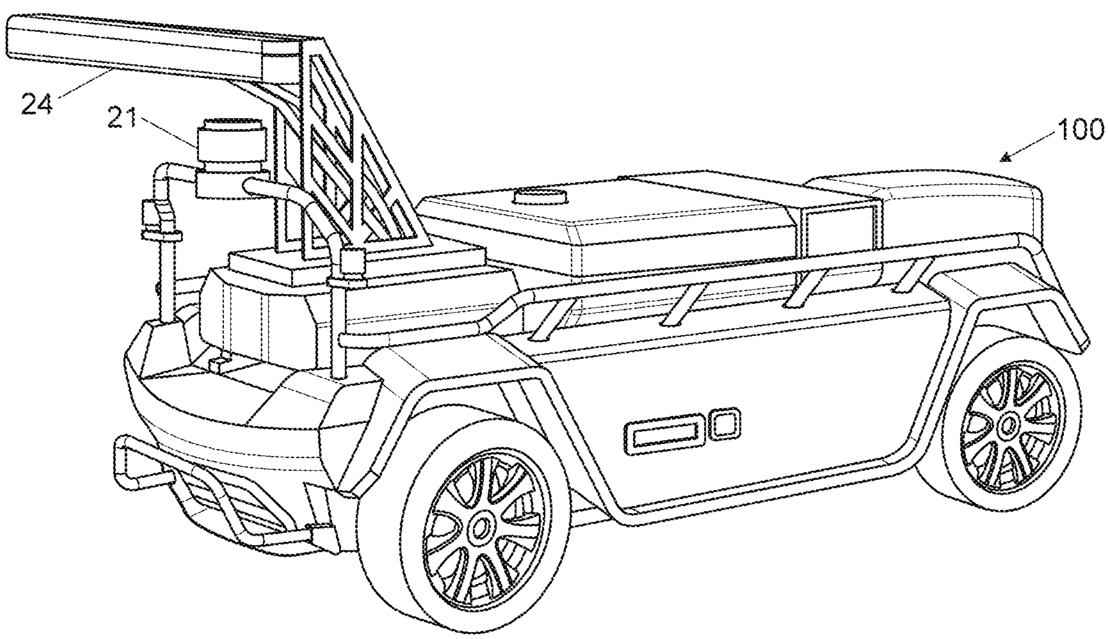
FIG. 2 schematically illustrates a vehicle according to embodiments of the present invention.

Detection unit 20 comprises an array of forward-facing cameras 21 configured to capture images of the runway or taxiway and transmit the images to FOD detection circuitry 22 (which may be some processing circuitry executing a computer vision algorithm for detecting FOD, as discussed below). FIG. 2 depicts forward-facing cameras 21 mounted to vehicle 100.

As alluded to previously, the quality of the images provided to FOD detection circuitry 22 has a significant impact on the reliability with which FOD may be detected. For example, if the images are too blurry (due to the relative motion between FOD and vehicle 100) and/or too dark (due to low light levels and/or the exposure time of the cameras), any subsequent post-processing of the images by FOD detection circuitry 22 may result in false-positive FOD detection (where a runway marking or cat's eye may falsely be detected as a piece of FOD, for example) and/or false-negative FOD detection (where a piece of FOD is determined to be a cat's eye and so is not flagged, for example).

The inventors have discovered that, in order to reduce the amount of captured motion blur within the images, each camera of array 21 must be "forward-facing". This means that the optical axis of each camera forms an acute (or zero) azimuthal/yaw angle and an acute (or zero) elevation/pitch angle with the forward direction of vehicle. For brevity's sake, it may be said that in order to be a "forward-facing" camera, said camera must be oriented such that a respective dot product arising between the camera's optical axis and the forward direction is greater than zero.

Similarly, a "rear-facing" camera may be a camera whose optical axis forms an acute (or zero) angle with the reverse direction of vehicle, the reverse direction being substantially opposite the forward direction. For brevity's sake, it may be said that in order to be a "rear-facing" camera, said camera must be oriented such that a respective dot product arising between the camera's optical axis and the forward direction is greater than zero. It will be appreciated that while the description discusses how an array of "forward-facing" cameras is arranged, the arrangement manners/methods/techniques discussed herein may alternatively or additionally be applied to an array of "rear-facing" cameras disposed on vehicle 100 (if present). Similarly, any discussion regarding the hardware/software features of the forward-facing cameras may alternatively or additionally be applied to rear-facing cameras.

As will be appreciated, the exposure time of forward-facing cameras 21 should be short (for example, shorter than that of driving cameras 15) so as to reduce the amount of motion blur in the captured images, thereby improving the reliability of FOD detection.

Given this, each forward-facing camera 21 may preferably be a high-speed camera. High-speed cameras are capable of providing such short exposure times due to their typically faster shutter speeds compared with more commercially available cameras used by photographers-such commercial cameras may even be used as driving cameras 15, for example.

High-speed cameras are typically defined as having a minimum exposure time which does not exceed 0.001 seconds. Some high-speed cameras may only have one exposure time, whereas others may allow a human/processor to adjust its shutter speed so as to adjust its exposure time within a predefined range. This latter arrangement—in which at least one of the high-speed cameras' exposure times is configurable within a predefined range of exposure times—may be advantageous in that an appropriate exposure time may be selected so as to take into account factors such as light levels (which change during the course of a day) or the velocity of vehicle 100 (which may travel faster on certain runways/taxiways due to time requirements, surface smoothness, and the like). In any case, the only/ minimum exposure time should preferably not exceed 0.001 seconds, as otherwise, the amount of captured motion blur may increase the likelihood/frequency/occurrence of false-positive/false-negative FOD detection.

Given the short exposure times used by forward-facing cameras 21, any motion blur due to vehicle vibration (as vehicle 100 travels along the runway or taxiway) is likely to be negligibly small. As such, array 21 may be rigidly fixed to vehicle 100 (as depicted in FIG. 2) without any intervening suspension system/stabilising mechanism (such as, shock absorbers, springs, tuned masses, and the like). This would therefore provide a lighter (and thus a faster and more manoeuvrable) vehicle 100, and also simplify its manufacture. Hence more generally, each forward-facing camera 21 may be mounted to vehicle 100 such that the forward-facing camera's orientation with respect to vehicle 100 is rigidly fixed.

In low light conditions (at sunrise and sunset, for example), longer exposure times are likely to be used by forward-facing cameras 21 (to ensure that the images are not underexposed-underexposure may lead to less reliable FOD detection). Given these longer exposure times, any motion blur due to vehicle vibration (as vehicle 100 travels along the runway or taxiway) is likely to be sufficient enough to impact the reliability of FOD detection. By providing damping pads (such as rubber feet, for example) between array 21 and vehicle 100, the vibrations may be damped to negligible levels. The damping pads are also advantageous in that they are less complex to install than whole suspension systems. The damping pads would also facilitate a rigid fixing between array 21 and vehicle 100—suspension systems would allow a degree of relative motion between array 21 and vehicle 100, which may risk unintentional changes to the arrangement of array 21, leading to reduced FOD detection reliability. Conversely and advantageously, the damping pads would help to maintain the arrangement of array 21 while vehicle 100 travels along the runway or taxiway. Hence more generally, vehicle 100 may comprise one or more damping pads between forward-facing cameras 21 and vehicle.

Alternatively or in addition to using damping pads to reduce motion blur, vehicle 100 may comprise a set of forward-facing light emitting elements 24 (seen in FIGS. 1 and 2). Light emitting elements 24 (such as LEDs, fluorescent/incandescent bulbs, and the like) may increase the amount of light incident on the runway or taxiway, thereby enabling shorter exposure times to be used by the forward-facing cameras 21, and thus ensuring that motion blur (due to relative motion between the FOD and vehicle and/or due to vehicle vibration) are kept at negligible levels.

A "forward-facing" light emitting element 24 may be taken to mean that the light emitting element is oriented such that a portion of the light emitted therefrom is incident upon at least one of the forward-facing cameras' fields of view. In other words, the light emitted from a forward-facing light emitting element 24 should illuminate part of the field of view at least one forward-facing camera 21.

Preferably, at least one of the forward-facing cameras' frame rates may be configurable within a predefined range of frame rates. This is to say, that the frame rate of the forward-facing camera(s) may be adjusted (by a human or by a processor executing suitable software instructions, for example) so as to take into account the vehicle's velocity (the vehicle may travel faster on certain runways/taxiways due to time requirements, surface smoothness, and the like). For example, it may be preferable to increase the frame rate for increasing velocities of vehicle 100, as otherwise FOD may enter and exit a forward-facing camera's field of view during a time period between successively captured image frames, meaning that the FOD cannot be detected by FOD detection circuitry 22.

To reduce the likelihood/frequency/occurrence of the FOD entering and exiting the forward-facing camera's field of view without being imaged, the frame rate of the at least one forward-facing camera 21 may preferably be configured such that, while the FOD lies within the forward-facing camera's field of view, the forward-facing camera captures at least three consecutive image frames depicting the FOD. This way, the FOD may be imaged enough times so as to be reliably detected by FOD detection circuitry 22. As will be appreciated, the determination of a such a frame rate may be based on a measurement of the time taken for a piece of FOD to travel along the imaging plane of a forward-facing camera when vehicle 100 travels along the runway or taxiway at a given velocity (hereafter called the image residence time). Given that the path taken by the FOD as it travels along the imaging plane may vary, repeated measurements may be taken, and an average image residence time may be determined. Alternatively, some mathematical relationship between the velocity of vehicle 100 and a length scale of the forward-facing camera's imaging plane may be derived and used to determine the image residence time of FOD. In any case, once the image residence time of FOD is found, it may be divided by the number of times the FOD is to be imaged (preferably three or more). The reciprocal of this quotient represents the frame rate to be used. For example, an (average) image residence time may be 0.5 seconds when vehicle 100 is travelling at a given velocity. Divided by four yields 0.125 seconds. The reciprocal of 0.125 seconds equals 8 frames per second. Thus, the forward-facing camera(s) 21 may have their frame rate(s) adjusted to 8 frames per second when vehicle 100 is travelling at the given velocity.

FOD detection circuitry 22 may be configured to detect the presence (and location) of FOD on the runway or taxiway. FOD detection and suitable sensors are generally known to the skilled person. However, according to the disclosure, the present FOD detection circuitry 22 may be configured to obtain, via the array of forward-facing cameras 21, images of the runway of taxiway, input the images to a machine learning model which is configured to determine the likelihood that FOD is present in the image. The FOD detection circuitry 22 may be further configured to obtain a result from the machine learning model, and determine, based on the result, whether (and where) FOD is present on the runway or taxiway.

As a non-limiting working example, FOD detection circuitry 22 may obtain an image from array 21. In this example, the image does include FOD, which may be a bolt which has fallen onto the runway or taxiway, for example. As will be appreciated, the FOD may take many forms, such as pebbles, rocks, shells, twigs, branches, scrap metal, glass, items dropped by personnel, and so on.

The image may then be input to a trained machine learning model configured to detect the presence of FOD in the image. This may involve extracting a feature vector from the image, and inputting elements of the feature vector to the input layer of machine learning model. The machine learning model may be a neural network. However, it is to be understood that the concepts of the disclosure are broadly applicable with different machine learning approaches.

The machine learning model typically comprises one or more layers, each layer comprising one or more nodes, and nodes in adjacent layers being connected by weights. The machine learning model typically comprises an input layer, one or more hidden layers, and an output layer. The output layer may be configured to output the probability that FOD is present in the input image, and/or the probability that FOD is not present in the image. The machine learning model 310 may be trained by any suitable method such as backpropagation, for example.

Since the image does include FOD in this example, the machine learning model 310 would output a high probability (for example, 51% or higher) that the image does show FOD, and/or a low probability (for example, 50% or lower) that the image does not show FOD.

This result is returned to the FOD detection circuitry 22, which determines, based on the result, whether FOD is present on the runway or taxiway. In the event that the (high and/or low) probability is around 50%-indicating that the machine learning model 310 was unable to provide a conclusive result-then vehicle 100 may be manoeuvred (by remote or autonomous control) to enable forward-facing cameras 21 to capture an image of the same area but from another angle. Other measures to ensure a conclusive result may include turning on a forward-facing light emitting element 24 (if present) to illuminate the runway or taxiway.

In the event that it is determined that FOD is present on the surface, then FOD detection circuitry 22 may provide some alert (via transceiver 23) to remote human inspectors so that the detected FOD may be removed from the runway or taxiway prior to the next take-off/landing of an aircraft. The alert may contain location data (such as GPS coordinates) of vehicle 100 indicating the vehicle's location at the time when the image containing FOD was captured. Using this location data, as well as the orientation of the forward-facing camera 24 which captured the image containing the FOD, and the FOD's location within the imaging plane, the location of the FOD may be determined.

As will be appreciated, FOD detection circuitry 22 may be comprised within a remote server, in which case transceiver 23 may transmit the images captured by array 21 to FOD detection circuitry 22 (via wireless communication methods, for example). Alternatively, vehicle 100 may comprise FOD detection circuitry 22 (as depicted in FIG. 1). This latter arrangement may be beneficial in that the time period between capturing an image of a piece of FOD and subsequently detecting the piece of FOD may be reduced, as the image is not being transmitted long distances to a server via wireless communication, but rather is being sent to the vehicle's onboard FOD detection circuitry 22. In other words, the lag time (or ping) associated with transmitting images from forward-facing cameras 21 to the FOD detection circuitry 22 may be reduced. Indeed, an onboard FOD detection circuitry arrangement may even have downstream benefits in that bandwidth requirements to send an alert to human inspectors may be reduced-rather than using a relatively high bandwidth connection to transmit a live stream of high resolution images from vehicle 100 to a remote server, to then send an alert to human inspectors using a relatively less bandwidth connection, the alert may be transmitted via from vehicle 100 to human inspectors using a single low bandwidth connection. Thus, the time taken from image capture to alert provision is reduced when using an onboard FOD detection circuitry 22.

Figure 3:
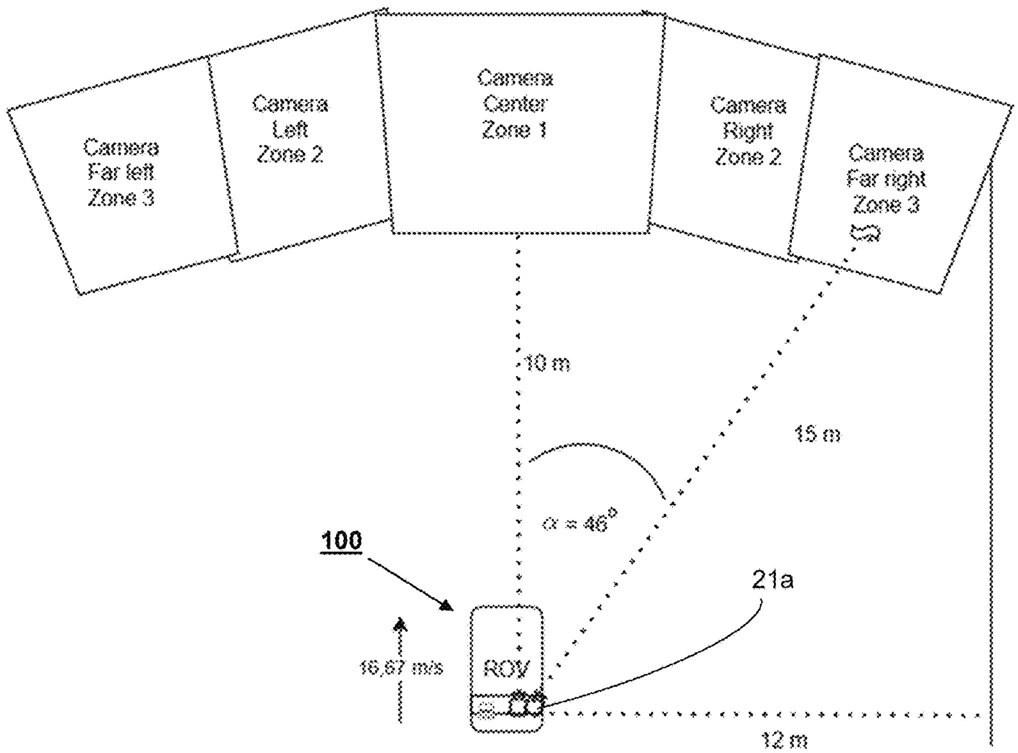
FIG. 3 schematically illustrates an array of forward-facing cameras of a vehicle according to embodiments of the present invention.

Turning now to FIG. 3, the array of forward-facing cameras 21 are arranged such that, when in use (that is, when vehicle 100 travels along the runway or taxiway in the forward direction), the forward-facing cameras' fields of view combine to form a cumulative field of view which spans a width of a to-be-imaged part of the runway or taxiway. It should be noted that FIG. 3 refers to vehicle 100 as an "ROV" or "remotely operated vehicle"-vehicle and ROV should be seen as synonymous within the context of the embodiments of the present invention. It should also be noted that while the fields of view/viewing frustums of forward-facing cameras 21 are not depicted in FIG. 3, the forward-facing cameras' imaging planes-onto which the fields of view are projected during the image capture process—are depicted as white quadrilateral "zones". Given the projection relationship between fields of view and imaging planes/"zones", the fields of view shall be discussed with reference to the zones depicted in FIG. 3. It should be further noted that any values used in FIG. 3 are entirely non-limiting.

As seen in FIG. 3, the zones combine to form a cumulative field of view (or cumulative camera zone) which spans a width of 24 metres—the half-width of this cumulative camera zone is given as 12 metres in FIG. 3 (see bottom right). The individual camera zones may overlap with each other (as depicted in FIG. 3), or may tesselate/abut with each other. Either way, the cameras zones may be thought of as "combining to form a cumulative camera zone" in that there is no gap between two adjacent camera zones, ensuring that there are no blind spots within the cumulative camera zone of array 21.

As will be appreciated, the width/span of the cumulative camera zone corresponds the part of the runway's or taxiway's width that is to be imaged by array 21 while vehicle 100 travels along the runway or taxiway in the forward direction. In other words, the cumulative camera zone corresponds to a width of a to-be-imaged part of the runway or taxiway when in use.

Preferably, the width of the to-be-imaged part of the runway or taxiway is greater than or equal to half of the width of the runway or taxiway. The typical width of a runway is 150 feet (or roughly 46 metres), and so to cover at least half of the width of a typical runway, the cumulative camera zone may have a span/width of roughly 23 metres or more—the arrangement depicted in FIG. 3 has a cumulative camera zone of 24 metres, as mentioned previously.

By imaging at least half the width of the runway or taxiway with array 21, vehicle 100 may complete an FOD detection process in two "sweeps" of the runway or taxiway-a first sweep being when vehicle 100 travels in a first direction within a first half of the runway's or taxiway's width (a left half, as viewed along the first direction, for example), and a second sweep being when vehicle 100 travels in a second direction (substantially opposite the first direction) within a second half of the runway's or taxiway's width (a right half, as viewed along the first direction, for example). For reference, FIG. 9—which shall be discussed in more detail later herein-depicts this "two sweep" FOD detection process.

As seen in FIG. 3, the array of forward-facing cameras 21 are arranged such that, when in use, a respective azimuthal angle arising between each forward-facing camera's optical axis and the forward direction does not exceed a limiting value, the azimuthal angle between an extremal forward-facing camera's (21*a*) optical axis and the forward direction being equal to the limiting value.

As mentioned previously, two conflicting requirements arise when arranging the array of forward-facing cameras 21. Firstly, the azimuthal angle between each forward-facing camera's optical axis and the forward direction should be reduced so as to minimise motion blur (and thus make FOD detection more reliable), yet this same azimuthal angle should be increased so as to maximise the span/range of the array's cumulative field of view (and thus make FOD detection faster).

The inventors have found that the respective azimuthal angle between each forward-facing camera's optical axis and the forward direction must not exceed a "limiting value" so as to prevent the amount of captured motion blur from exceeding a maximum tolerable amount.

As will be appreciated, at least one of the camera zones making up the cumulative camera zone spans an outer extremal region of the array's cumulative camera zone ("camera far left zone 3" or "camera far right zone 3" of FIG. 3, for example). The forward-facing camera(s) whose field(s) of view spans the outer extremal region(s) is referred to as an extremal forward-facing camera 21*a*.

Given this, the limiting value may be thought of as the azimuthal angle value arising between the extremal forward-facing camera's optical axis and the forward direction. When oriented at this limiting value, the extremal forward-facing camera is able to capture images of the outer extremal region with an amount of motion blur that is less than or equal to the maximum tolerable amount. Determining the limiting value shall be discussed later herein.

As seen in FIG. 3, the limiting value, a, is equal to 46 degrees, and so each forward-facing camera 21 is oriented so that the azimuthal/yaw angle between its optical axis and the forward direction is less than or equal to 46 degrees, with the optical axis of extremal forward-facing camera 21*a* being oriented at 46 degrees with respect to (for example, clockwise from) the forward direction for capturing images within camera far right zone 3. As will be appreciated, another extremal forward-facing camera 21*a* may be oriented at 46 degrees with respect to (for example, anticlockwise from) the forward direction for capturing images within camera far left zone 3.

Figure 4:
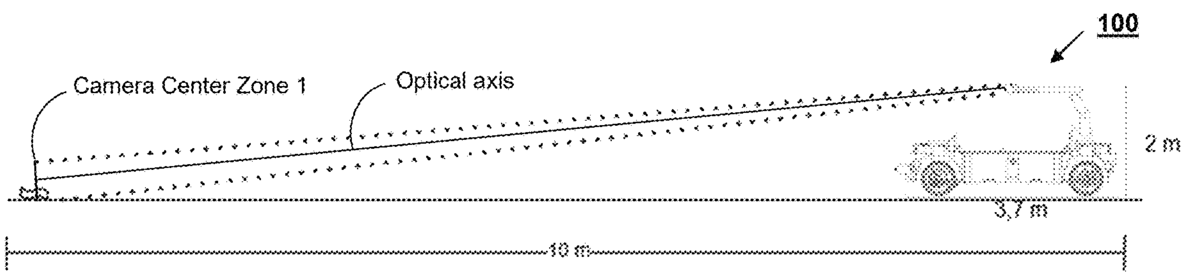
FIG. 4 schematically illustrates a side view of a vehicle according to embodiments of the present invention.

As seen in FIGS. 3 and 4, the array of forward-facing cameras 21 are arranged such that, when in use, each forward-facing camera's imaging plane is positioned such that its displacement along the forward direction is at least a threshold distance away from its respective forward-facing camera, the threshold distance being determined based on the width of the to-be-imaged part of the runway or taxiway, and the limiting value.

As mentioned previously, once the limiting value is determined, the width of the to-be-imaged part of the runway or taxiway (that is, the total span of the cumulative field of view/camera zone) may be freely selected (for example, 24 metres). Ensuring that the fields of view of each forward-facing camera 21 combine to form the cumulative field of view having the selected total span (24 metres) then becomes a matter of distancing each field of view from its respective forward-facing camera 21 by the appropriate amount.

In particular, once the total span of the cumulative field of view is selected, each forward-facing camera's imaging plane is positioned such that its displacement along the forward direction is at least a threshold distance away from its respective forward-facing camera 21. Given the constraint of the limiting value, this threshold distance ensures that the imaging planes of the forward-facing cameras span the width of the to-be-imaged part of the runway or taxiway, and so ensures that the fields of view combine to form the cumulative field of view having the selected total span. Determining the threshold distance shall be discussed later herein.

As seen in FIGS. 3 and 4, the threshold distance is 10 metres. The inventors have surprisingly found that a threshold distance of 10 metres or greater significantly reduces the likelihood/frequency/occurrence of false-positive FOD detection. Therefore, the threshold distance may preferably be greater than or equal to 10 metres.

In any case, it should be noted that the threshold distance is not necessarily related to the distance between an imaging plane and its respective forward-facing camera 21, but rather to the displacement of the imaging plane from its respective forward-facing camera 21 with respect to the forward direction. For example, and as seen in FIG. 3, while camera center zone 1 may be 10 metres away from its respective forward-facing camera 21 to satisfy the threshold distance requirement (due to the respective optical axis being parallel to the forward direction), camera far right zone 3 is 15 metres away from extremal forward-facing camera 21 in order that the displacement in the forward direction therebetween satisfies the threshold distance requirement of 10 metres or more.

Figure 5A:
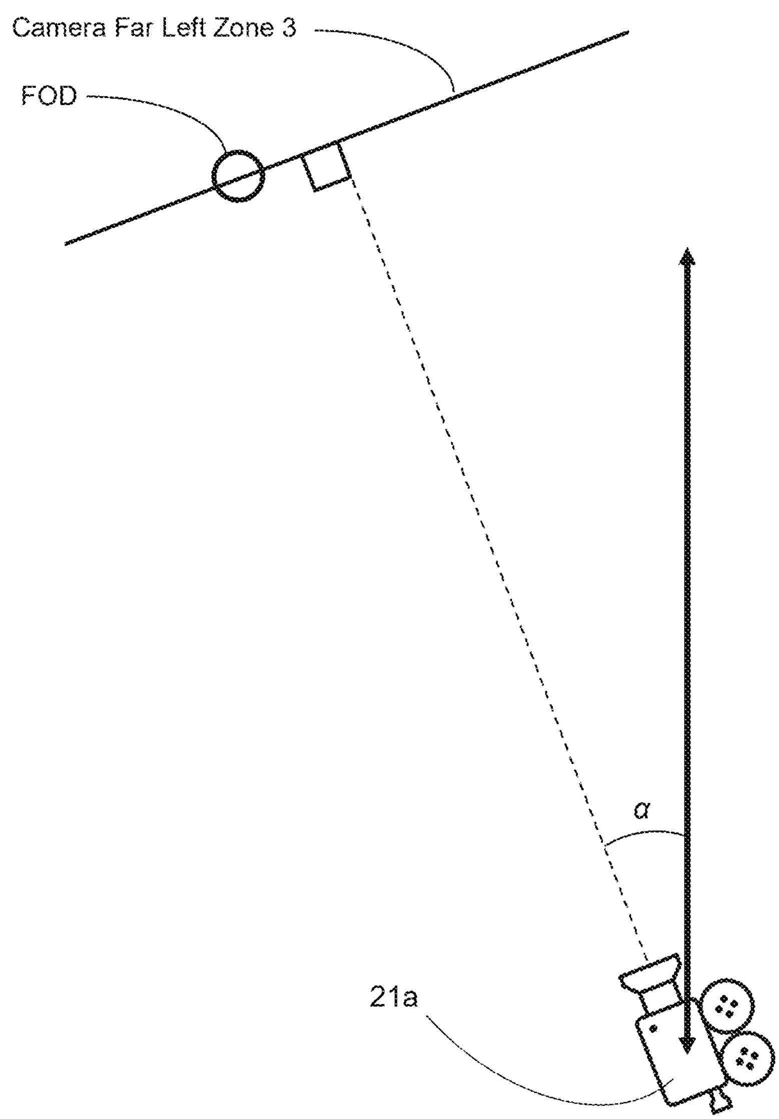
FIGS. 5A and 5B schematically illustrate an extremal forward-facing camera of the vehicle according to embodiments of the present invention.
Figure 5B:
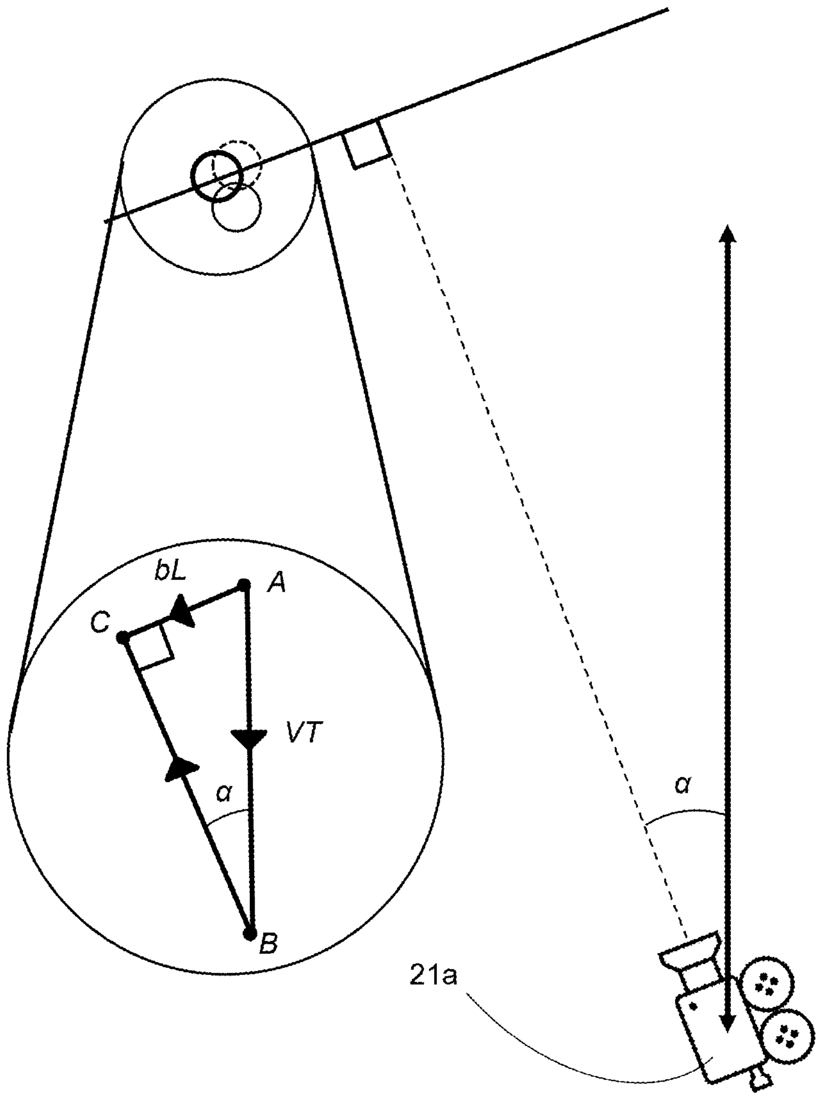

Turning now to FIGS. 5A and 5B, the limiting value is determined based on the extremal forward-facing camera's exposure time, a length scale of the FOD to be detected by the extremal forward-facing camera, a maximum tolerable amount of captured motion blur, and the vehicle's velocity. It should be noted that the following is an entirely non-limiting approach to determining the limiting value.

FIG. 5A depicts a starting moment of an image capturing process in which extremal forward-facing camera 21*a* captures an image of FOD within camera far left zone 3 (that is, the imaging plane of extremal forward-facing camera 21*a*). This starting moment may be thought of as the point in time in which the shutter of extremal forward-facing camera 21*a* is triggered into motion. FIG. 5B depicts an ending moment of the same image capturing process. The ending moment may be thought of as the point in time in which the shutter has completely/closed. The time period between the starting and ending moments of the image capturing process may therefore be thought of as the exposure time of extremal forward-facing camera 21*a*.

Figure 6A:
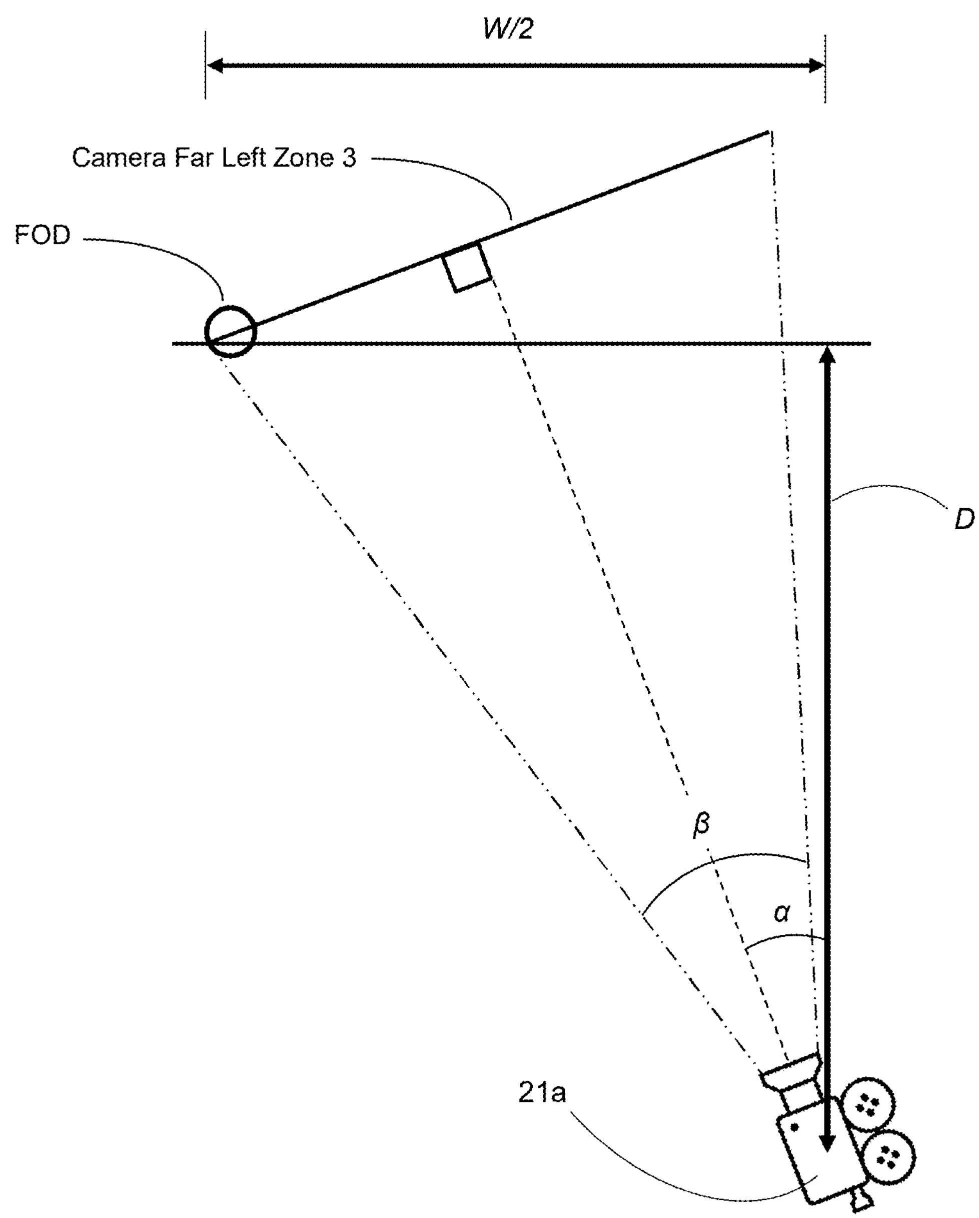
FIGS. 6A and 6B schematically illustrate an extremal forward-facing camera of the vehicle according to embodiments of the present invention.
Figure 6B:
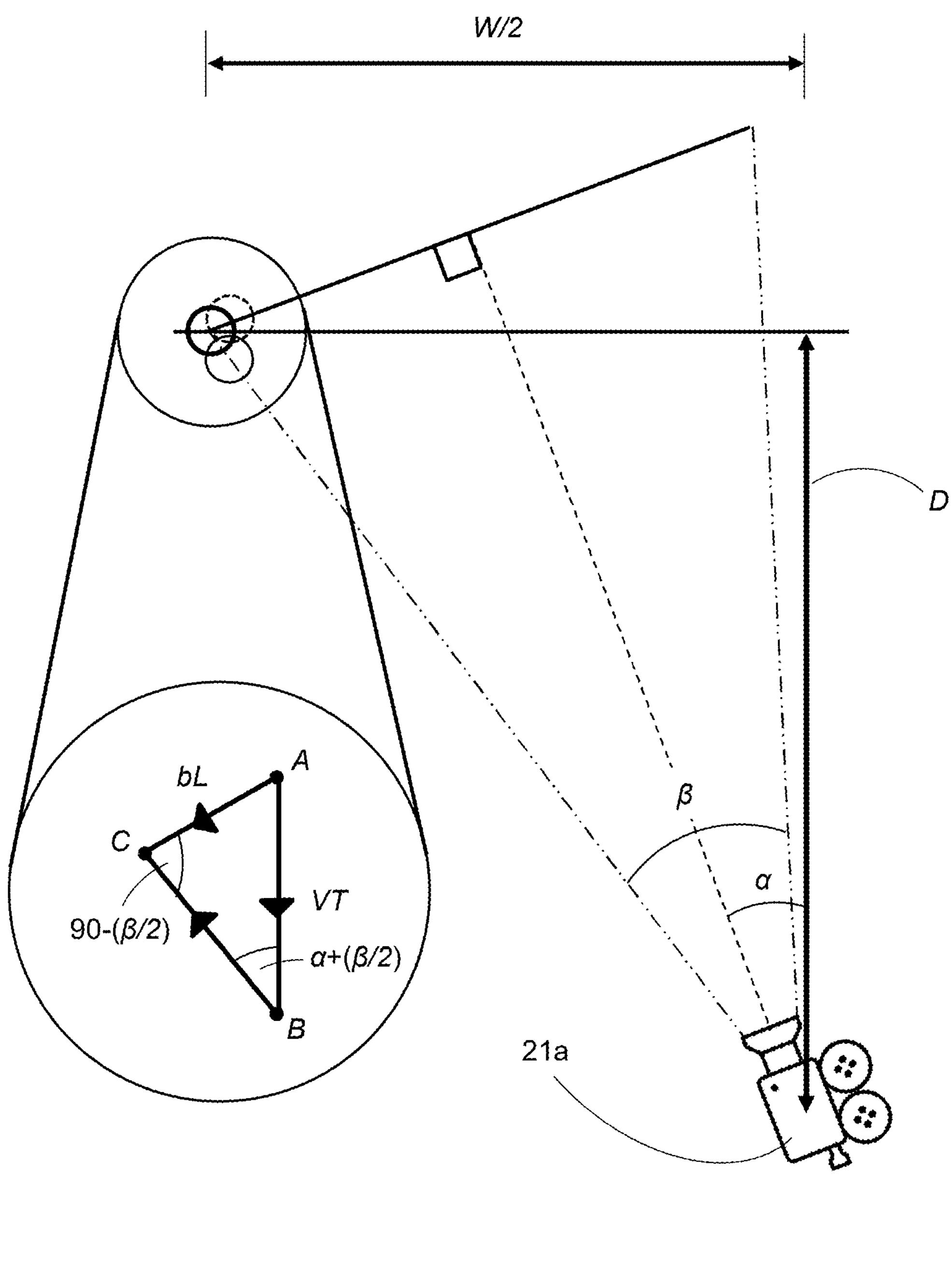

As seen in FIGS. 6A and 6B, the optical axis of extremal forward-facing camera 21*a* is oriented at an angle of a away from the forward direction. $\alpha$ is currently not known.

As seen in FIG. 5A, the relative position of the FOD with respect to extremal forward-facing camera 21*a* is such that the FOD coincides with camera far left zone 3. This positioning has been selected so that the length scale of the FOD within the imaging plane (that is, the intra-frame length scale) is substantially equal to the real-world length scale of the FOD, making calculation simpler.

Due to the forward direction of travel of vehicle 100 during the image capturing process, the FOD travels in a backward direction (opposite the forward direction) relative to extremal forward-facing camera 21*a*. This is seen in FIG. 5B, where the FOD travels away from camera far left zone 3 in a backward direction—the circle with dotted line represents the FOD's position at the starting moment, and the circle with the solid line represents the FOD's position at the ending moment. As a result of this relatively backward motion, the FOD is projected onto the imaging plane (camera far left zone 3) at a new location (depicted in FIG. 5B as the circle with the bold solid line).

As will be appreciated, this change in location within the imaging plane (that is, this intra-frame displacement) during the closing of the shutter results in the extremal forward-facing camera 21*a* capturing a blurry image of the FOD.

By defining the amount of captured motion blur as a ratio of the intra-frame displacement of the FOD and an intra-frame length scale of the FOD, a vector triangle may be derived, and a value of a may be determined. FIG. 5B depicts such a vector triangle. Point A represents the centroid of the FOD at the starting moment, Point B represents the centroid of the FOD at the ending moment, and Point C represents the centroid of the FOD at the ending moment once projected (along the direction of the optical axis) onto the imaging plane. The displacement vector $\overrightarrow{AB}$ represents the distance travelled by the FOD during the image capturing process. $\overrightarrow{AB}$ has a magnitude of VT, where V is the velocity of vehicle 100, and T is the exposure time of extremal forward-facing camera 21$a$. The displacement vector $\overrightarrow{AC}$ represents the intra-frame displacement of the FOD during the image capturing process. $\overrightarrow{AC}$ has a magnitude of bL, where b is the blur ratio defined above, and L is the intra-frame length scale of the FOD (which in this case is substantially equal to the real-world length scale of the FOD). The displacement vector $\overrightarrow{BC}$ represents the projection distance of the FOD—its magnitude is not required for determining α.

The angle between $\overrightarrow{AB}$ and $\overrightarrow{BC}$ is equal to α. This is because the optical axis of extremal forward-facing camera 21$a$ is at an angle of a away from the forward direction (and backward direction). The angle between $\overrightarrow{AC}$ and $\overrightarrow{BC}$ is equal to 90 degrees. This is because the optical axis is perpendicular to the imaging plane.

The relationship between exposure time T and angle α is a trigonometric one, as seen in equation [1]:

$$\sin\alpha = \frac{bL}{VT} \qquad [1]$$

Rearranging for a yields equation [2]:

$$\alpha = \sin^{-1}\left(\frac{bL}{VT}\right) \qquad [2]$$

Thus, determining the value of a is based on the values of b, L, V, and T.

Regarding b, a maximum tolerable amount of captured motion blur (that is, a maximum value of b) may be defined as the ratio of a maximum allowable intra-frame displacement of the FOD and an intra-frame length scale of the FOD. By using this maximum value of b, a maximum value of a (that is, the limiting value) may be determined. Preferably, this ratio does not exceed 0.2. This is to say that the maximum tolerable amount of captured motion blur may be 20% of the inter-frame length scale of the FOD, or less. This way, the reliability of FOD detection may be improved, as the extent of motion blur is not so much as to cause false-positive or false-negative FOD detection.

Regarding L, the length scale of the FOD to be detected by the extremal forward-facing camera 21$a$ may preferably be greater than or equal to one centimetre. This way, a wide range of FOD may be detected, even down to the scale of small vehicle parts (such as nuts and bolts, for example).

Regarding V, the velocity of vehicle 100 may be greater than or equal to 40 kilometres per hour. This way, carrying out the FOD detection process using vehicle 100 may take less time than using a human inspector (such as airport staff). Preferably, the velocity of vehicle 100 may be 60 kilometres per hour (or 16.67 metres per second, as seen in FIG. 3). The inventors have found that this velocity provides an optimal balance between speed and reliability of the FOD detection process.

Regarding T, the exposure time of extremal forward-facing camera 21$a$ may be determined based on the light levels at the time the FOD detection process is to be carried out—lower light levels (at sunrise or sunset, for example) may result in longer exposure times being used, as mentioned previously. Preferably, extremal forward-facing camera 21$a$ may be a high-speed camera (with a minimum exposure time not exceeding 0.001 seconds).

In the non-limiting example of FIG. 3, the following values were used: b=0.2, L=0.01 metres (one centimetre), V=16.67 m/s (60 kilometres per hour), and T=0.00017 seconds. Substituting these values into equation [2] yields a limiting value of α=46 degrees.

Once the limiting value is determined, the threshold distance may be determined. As will be appreciated, in order for camera far left zone 3 to cover the left edge of the cumulative field of view, it may be displaced by half the span, W, of the cumulative field of view along the lateral/spanwise direction (which is perpendicular to the forward direction). This results in a right-angled triangle being formed between the optical axis, the forward direction and the spanwise direction of the cumulative field of view. Knowing that the angle between the optical axis and the forward direction is a (46 degrees in this case), a trigonometric relationship between the threshold distance, D (along the forward direction), the half-span of the cumulative camera zone, W/2 (along the spanwise direction), and angle α, may be derived, as seen in equation [3]:

$$\tan(\alpha) = \frac{W/2}{D} \qquad [3]$$

Rearranging for D yields equation [4]:

$$D = \frac{W/2}{\tan(\alpha)} \qquad [4]$$

In the non-limiting example of FIG. 3, W/2=12 m, and α=46 degrees. Substituting these values into equation [4] yields a threshold distance D=11.6 metres.

From the above, it has been shown that the limiting value is determined based on the exposure time of extremal forward-facing camera 21$a$, a length scale of the FOD to be detected by the extremal forward-facing camera 21$a$, a maximum tolerable amount of captured motion blur, and the velocity of vehicle 100. It has also been shown that the threshold distance is determined based on the width of the to-be-imaged part of the runway or taxiway, and the limiting value.

It will be appreciated that equations [3] and [4] work on the assumption that the cumulative field of view spans between the optical axes of the extremal forward-facing cameras (the far left and far right cameras, for example). This assumption, while it provides a value for D, does not take into account the entire span of the cumulative field of view, which lies between the outer edges of the extremal forward-facing cameras (from the left edge of the camera far left zone 3 to the right edge of the camera far right zone 3, for example). Thus, to provide a more accurate modelling of the cumulative field of view when determining the threshold distance, the extremal forward-facing camera's field of view may be considered.

Turning now to FIG. 6A, the optical axis of extremal forward-facing camera 21$a$ is oriented at an angle of a away from the forward direction (like with FIG. 5A), and ha a field of view expressible as an angle of β. Moreover, the left edge of the camera far left zone 3 is displaced by a distance D along the forward direction, and is displace by half the span, W, of the cumulative field of view along the lateral/spanwise direction, hence W/2.

As seen in FIG. 6A, a right-angled triangle is formed between the distance, D, the half-span of the cumulative camera zone, W/2, and the left side of the field of view of extremal forward-facing camera 21$a$. A trigonometric relationship between α, β, D and W may be derived, as seen in equation [5]:

$$\tan\left(\alpha + \frac{\beta}{2}\right) = \frac{W/2}{D} \quad [5]$$

Rearranging for D yields equation [6]:

$$D = \frac{W/2}{\tan\left(\alpha + \frac{\beta}{2}\right)} \quad [6]$$

In the non-limiting example of FIG. 3, W/2=12 m, α=46 degrees and β=8.5 degrees. Substituting these values into equation [6] yields a threshold distance D=9.98 metres, which, rounded up, yields 10 metres. To ensure that the likelihood/frequency/occurrence of false positive FOD detection is reduced, a value of D=10 metres (or more) may be used.

From the above, it has been shown that the threshold distance may optionally be determined based on the extremal forward-facing camera's field of view. This assumption, while it provides a value for a, does not take into account that the greatest amount of motion blur likely occurs at the edges of the image frame.

It will be appreciated that equations [3] and [4] work on the assumption that the FOD is situated at/proximate to the extremal forward-facing camera's optical axis. As will be further appreciated, this effect may be exaggerated when using increasingly larger fields of view-images taken with fish-eye lens typically exhibit the largest degree of motion blur at the edges of the image. Therefore, to ensure that the likelihood/frequency of captured motion blur surpassing the maximum tolerable amount may be reduced, the extremal forward-facing camera's field of view may be considered when determining the limiting value.

Turning now to FIGS. 6A and 6B, it will be shown that the limiting value may be determined based on the extremal forward-facing camera's field of view.

FIG. 6A (like with FIG. 5A) depicts a starting moment of an image capturing process in which extremal forward-facing camera 21$a$ captures an image of FOD within camera far left zone 3 (that is, the imaging plane of extremal forward-facing camera 21$a$). This starting moment may be thought of as the point in time in which the shutter of extremal forward-facing camera 21$a$ is triggered into motion. FIG. 6B (like with FIG. 5B) depicts an ending moment of the same image capturing process. The ending moment may be thought of as the point in time in which the shutter has completely/closed. The time period between the starting and ending moments of the image capturing process may therefore be thought of as the exposure time of extremal forward-facing camera 21$a$.

As seen in FIGS. 6A and 6B, the optical axis of extremal forward-facing camera 21$a$ is oriented at an angle of a away from the forward direction, and has a field of view expressible as an angle of β. β is known, while a is not. Moreover, the left edge of the left edge of camera far left zone 3 is displaced by a distance of D along the forward direction, and is displaced by half the span, W, of the cumulative field of view of array 21 along the lateral/spanwise direction, hence W/2.

As will be appreciated, the scenario depicted in FIGS. 6A and 6B resembles that depicted in FIGS. 5A and 5B, albeit that the resulting velocity triangle has been adapted to account for β.

In the velocity triangle of FIG. 6B, the angle between $\overrightarrow{AB}$ and $\overrightarrow{BC}$ is equal to $$\alpha + \frac{\beta}{2}.$$

This is because the optical axis of extremal forward-facing camera 21$a$ is at an angle of α away from the forward direction, and the left edge of the imaging plane (at which point C is located) is at an angle of β/2 away from the optical axis. The angle between $\overrightarrow{AC}$ and $\overrightarrow{BC}$ is equal to $$90 - \frac{\beta}{2}.$$

This is because a right-angled triangle is formed between the optical axis, the imaging plane and the left side of the field of view, and as with any other triangle, the internal angles of this triangle must sum to 180 degrees. Therefore, $$180 - 90 - \frac{\beta}{2} = 90 - \frac{\beta}{2}.$$

Using the sine rule on this vector triangle yields equation [7]:

$$\frac{\sin\left(\alpha + \frac{\beta}{2}\right)}{bL} = \frac{\sin\left(90 - \frac{\beta}{2}\right)}{VT} \quad [7]$$

Rearranging for α yields equation [8]:

$$\alpha = \sin^{-1}\left(\frac{bL \times \sin\left(90 - \frac{\beta}{2}\right)}{VT}\right) - \frac{\beta}{2} \quad [8]$$

Thus, determining the value of a may be based on the values of b, L, V, T, and β. The values of b, L, V, and T have been discussed previously.

Regarding β, the field of view of extremal forward-facing camera 21$a$ (that is, cameras far left zone 3) may be configured so as to ensure that it abuts/overlaps with an adjacent field of view (camera left zone 2, for example). The field of view of extremal forward-facing camera 21$a$ may be adjustable within a predefined range of values, or may be fixed.

In the non-limiting example of FIG. 3, the following values were used: b=0.2, L=0.01 metres (one centimetre), V=16.67 m/s (60 kilometres per hour), T=0.00017 seconds, and β=8.5 degrees. Substituting these values into equation [8] yields a limiting value of α=40.5 degrees, which is smaller than the 46 degrees obtained using equation [2]. This is to be expected given that the FOD has been modelled as being proximate to the left edge of the extremal forward-facing camera's field of view, as opposed to being proximate to the extremal forward-facing camera's optical axis.

It will be appreciated that equations [1], [2], [7] and [8] work on the assumption that the value of T is known/selected already, such as when the camera to be used as extremal forward-facing camera 21$a$ only has a single exposure time, for example. However, and as mentioned previously, light levels change during the course of a day, and so a specified exposure time may provide an optimally exposed image at a first time in the day, and an underexposed image at a second time of the day (leading to less reliable FOD detection).

As will be appreciated, the amount of light sensed by a camera's sensor (that is, the amount of exposure) may be adjusted based on the illuminance of the imaged object, and the camera's aperture size and exposure time. While increasing the exposure time of the camera may increase the exposure of the camera's sensor, it also increases the amount of captured motion blur (which leads to less reliable FOD detection). Similarly, while increasing the aperture size of the camera may increase exposure of the camera's sensor, it also decreases the depth of field of the image, and so increases the size of out-of-focus regions in the image (which also leads to less reliable FOD detection). Therefore, to ensure that the extremal forward-facing camera's sensor is optimally exposed while increasing the reliability of FOD detection, the illuminance of the FOD and the aperture size of the camera may be taken into consideration when determining the limiting value.

Figure 7A:
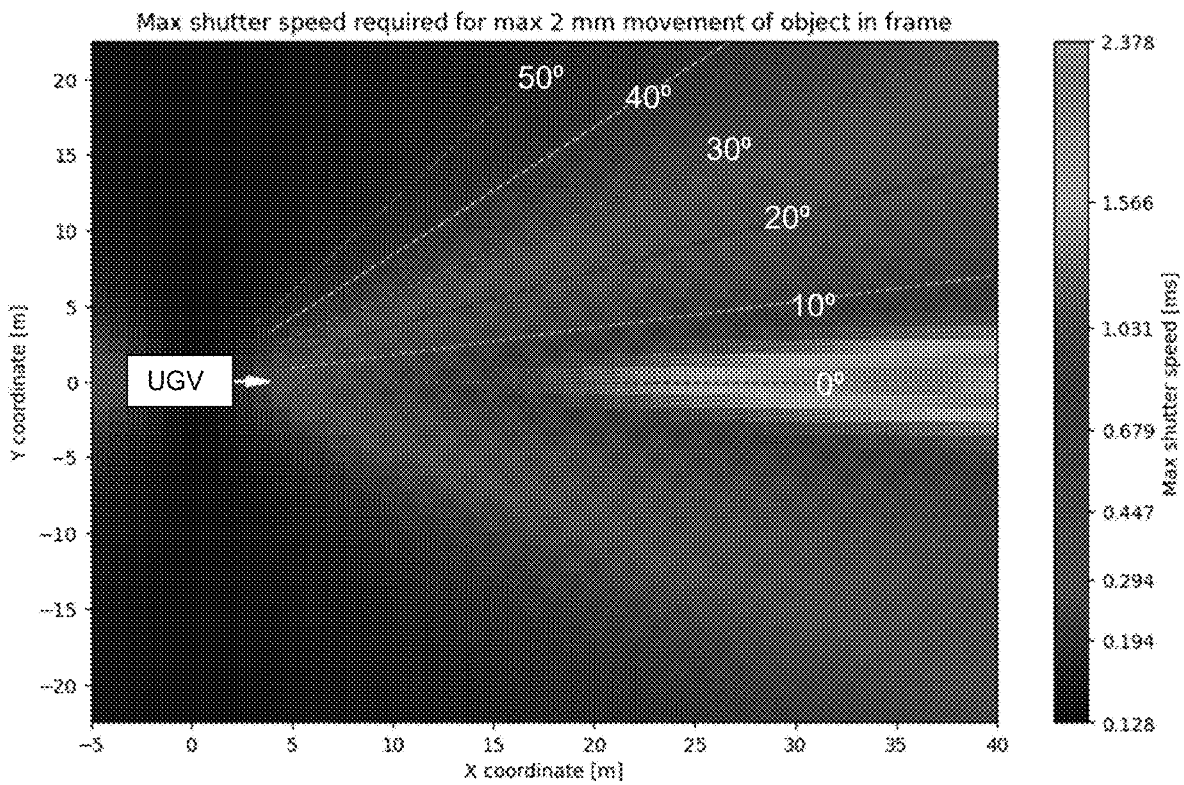
FIG. 7A illustrates a graph/chart depicting the relationship between the limiting value and the exposure time of the extremal forward-facing camera.
Figure 7B:
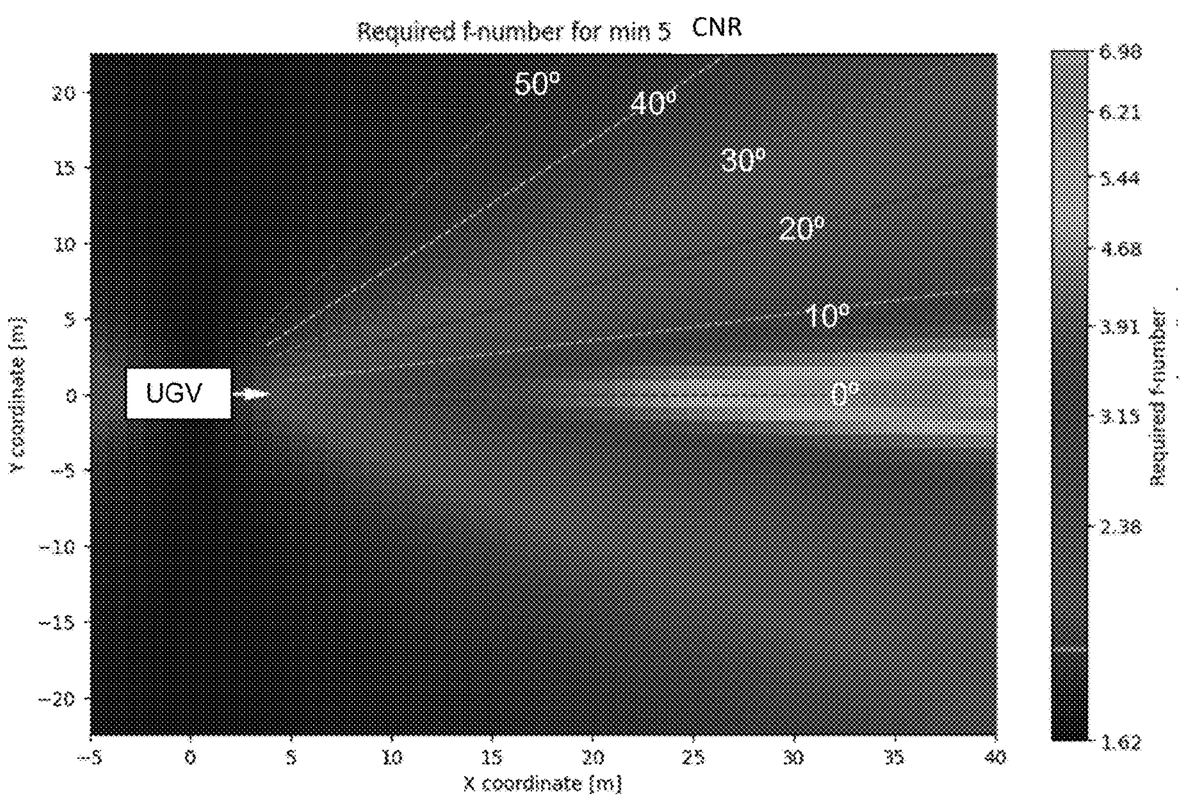
FIG. 7B illustrates a graph/chart depicting the relationship between the limiting value and the aperture size of the extremal forward-facing camera.
Figure 8:
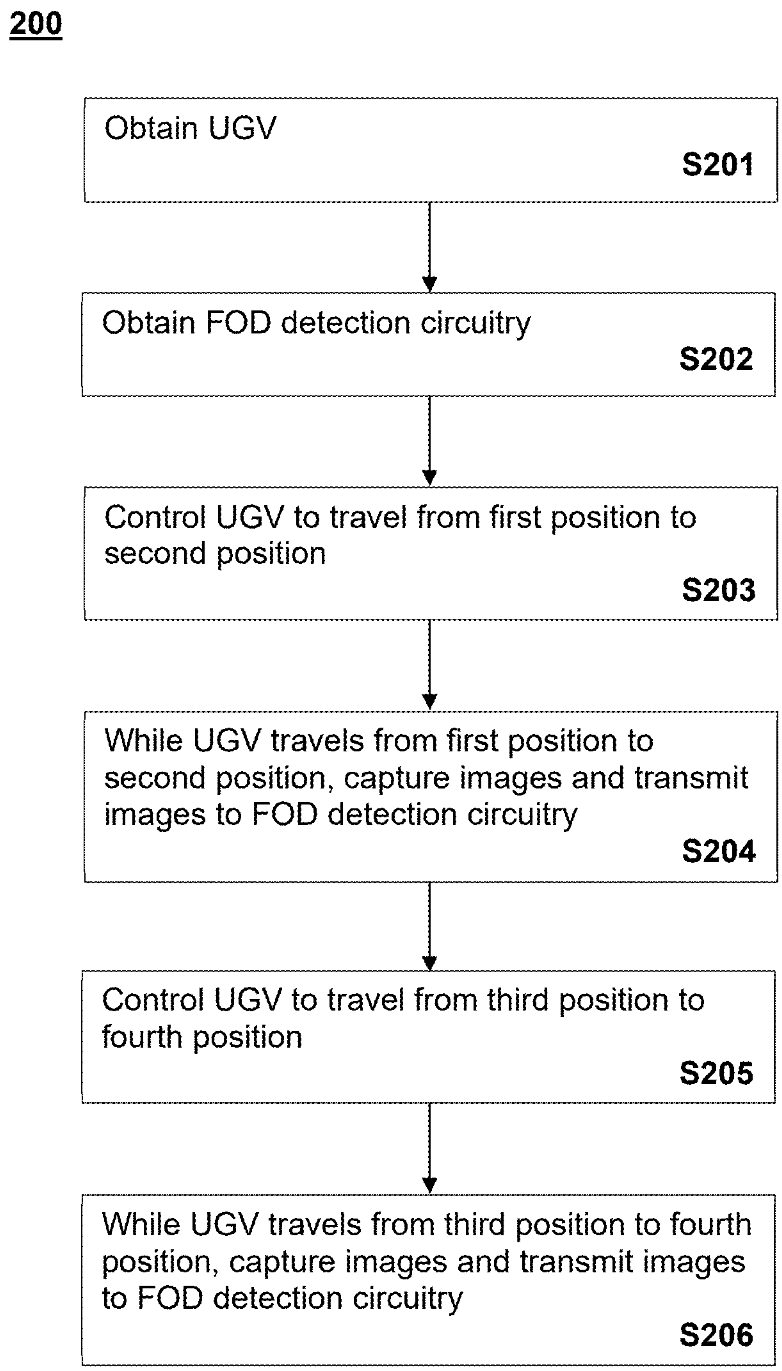
FIG. 8 depicts a flowchart illustrating a method of detecting foreign object debris according to embodiments of the present invention.

Turning to FIGS. 7A and 7B, it will be shown that the limiting value may be determined based on the extremal forward-facing camera's aperture size, and the illuminance of the FOD to be detected by the extremal forward-facing camera.

As mentioned previously, equations [1] and [7] work on the assumption that the value of T is known/selected already. However, if T is not already known (because a camera has not been selected yet, for example), then equations [1] and [7] involves two unknown quantities, a and T. In this case, equations [1] and/or [7] may be plotted as a graph/chart. This is seen in FIG. 7A, where equation [1] has been plotted to create a graph/chart depicting the relationship between α and T. It can be seen from FIG. 7A that T decreases with increasing values of a (from 0 degrees to 50 degrees, for example).

FIG. 7B depicts a similar graph/chart. However, this graph/chart depicts the relationship between α and aperture size (that is, f-number). To obtain this relationship, the signal-to-noise ratio (SNR) is considered. Equation [9] outlines the relationship between SNR of an image and parameters of the camera used to capture the image:

$$SNR = \frac{IQT}{\sqrt{IQT + (N_d T)^2 + N_r^2}} \quad [9]$$

Where / is the photon flux of the camera's sensor, Q is the quantum efficiency of the camera's sensor, T is the exposure time of the camera, $N_d$ is the dark current of the camera's sensor, and $N_r$ is the read noise of the camera. The inventors have found that $N_d$ and $N_r$ can be assumed to be zero, resulting in equation [10]:

$$SNR = \frac{IQT}{\sqrt{IQT}} = \sqrt{IQT} \quad [10]$$

Regarding /, the photon flux may be defined as the number of photon passing through/impinging on a unit area per unit time. Equation [11] may be used to find the photon flux passing through the camera's sensor:

$$I = \frac{ERA}{4f^2} \times \frac{\lambda}{683hc} \quad [11]$$

Where E is the illuminance of the imaged scene (in units of lux), R is reflectivity of the object (a unitless value between 0 and 1), A is the area of the camera's sensor, f is the f-number of the camera's aperture, λ is the wavelength of incident light (an average value of 555 nanometres is used herein), h is Planck's constant, and c is the speed of light. The number 683 is used as a conversation factor to convert between units of lux and W/m2. Regarding E, the illuminance of the imaged scene may be greater than or equal to 1000 lux (which represents the typical light level of an overcast day). If vehicle 100 is to operate in darker conditions, such as at sunset/twilight, then the set of forward-facing light emitting elements 24 may be employed to provide an illuminance of at least 1000 lux. It will be appreciated that the illuminance of the FOD may be represented by the quantity ER, that is, the product of the illuminance of the scene and the reflectance of the FOD.

Regarding Q, the quantum efficiency may be defined as the efficiency with which a camera's sensor converts incident photons (reflected/emitted from the to-be-imaged object) into electrons (which are used to create an image). Like with /, Q depends on λ. For an average λ of 555 nanometres, a value of Q between 50% and 80% is achievable for sensors of high-speed cameras.

In any case, substituting equations [1] and [11] into equation [10] yields equation [12]:

$$SNR = \sqrt{\frac{ERA}{4f^2} \times \frac{\lambda}{683hc} \times Q \times \frac{bL}{V \sin\alpha}} \quad [12]$$

The inventors have found that to ensure a reliable FOD detection, the value of SNR should be greater than or equal to 5, with 10 being preferable. Substituting SNR=5 into equation [12] and rearranging yields equation [13]:

$$\sin\alpha = \frac{ERA}{4f^2} \times \frac{\lambda}{683hc} \times Q \times \frac{bL}{25V} \quad [13]$$

In equation [13], all quantities apart from α and f are known. Thus, like with equation [1], equation [13] can be plotted as a graph/chart depicting the relationship between α and f.

As mentioned previously, the FOD to be detected is typically much smaller than the size of the runway or taxiway (which may occupy the majority/entirety of the image frame). As such, adjusting the aperture size of the extremal forward-facing camera may result in a less reliable FOD detection, as the camera's sensor is adjusted to that only a small portion of it is optimally exposed (to light reflected from a small piece of FOD, for example) given the exposure time, with the remainder of the sensor being under-/over-exposed. Therefore, it may be more beneficial to consider the difference in illuminance of (that is, the contrast between) the FOD and the runway or taxiway when determining aperture size, as a greater portion of the camera's sensor may be (more) optimally exposed (to light reflected from the imaged portion of the runway or taxiway, for example) given the exposure time. Thus, it will be shown that the limiting value may be determined based on the illuminance of the runway or taxiway.

Equation [14] outlines how a contrast to noise ratio (CNR) may be determined based on the photon flux of light reflected from the FOD ($I_{FOD}$) and the photon flux of light reflected from the runway/taxiway ($I_{RT}$):

$$CNR = \frac{|I_{FOD}QT - I_{RT}QT|}{\sqrt{I_{FOD}QT + I_{RT}QT}} \quad [14]$$

Substituting equations [1] and [11] into equation [14] yields equation [15]:

$$CNR = \frac{|R_{FOD} - R_{RT}|}{\sqrt{|R_{FOD} + R_{RT}|}} \times \sqrt{\frac{ERA}{4f^2} \times \frac{\lambda}{683hc} \times Q \times \frac{bL}{V\sin\alpha}} \quad [15]$$

Where $R_{FOD}$ is the reflectance of the FOD, and $R_{RT}$ is the reflectance of the runway/taxiway. It will be appreciated that the illuminance of the FOD may be represented by the quantity $ER_{FOD}$, that is, the product of the illuminance of the scene and the reflectance of the FOD. Similarly, it will be appreciated that the illuminance of the runway/taxiway may be represented by the quantity $ER_{RT}$, that is, the product of the illuminance of the scene and the reflectance of the runway/taxiway.

As with SNR, the inventors have found that to ensure a reliable FOD detection, the value of CNR should be greater than or equal to 5, with 10 being preferable. Substituting CNR=5 into equation [15] and rearranging yields equation [16]:

$$\sin\alpha = \left(\frac{|R_{FOD} - R_{RT}|}{\sqrt{|R_{FOD} + R_{RT}|}}\right)^2 \times \frac{ERA}{4f^2} \times \frac{\lambda}{683hc} \times Q \times \frac{bL}{25V} \quad [16]$$

In equation [16], all quantities apart from α and f are known. Thus, like with equation [1], equation [16] can be plotted as a graph/chart depicting the relationship between α and f, as seen in FIG. 7B. It can be seen from FIG. 7B that the aperture size increases (that is, the f-number decreases) with increasing values of α (from 0 degrees to 50 degrees, for example). It should be noted that the scale of f-number on the right hand side of FIG. 7B represents the denominator of the f-number. For example, while the scale depicts an f-number of 3.15, this represents an f-number of f/3.15, which is the typical manner of describing the f-number.

By reviewing the graphs/charts depicted in FIGS. 7A and 7B, suitable values of T and f for the extremal forward-facing camera 21*a* may be selected, and from this, the corresponding value of a to be used for the extremal forward-facing camera 21*a* may be determined. Thus, the limiting value may be determined based on the extremal forward-facing camera's aperture size, the illuminance of the FOD to be detected by the extremal forward-facing camera, and the illuminance of the runway or taxiway.

Preferably, and turning back to FIG. 4, array 21 may be arranged such that, when in use, a respective height of each forward-facing camera's principal point from the runway or taxiway is substantially half of a height of the forward-facing camera's imaging plane. As will be appreciated, the principal point is the point where the optical axis and imaging plane (camera center zone 1) intersect, which is typically the centre of the imaging plane. By ensuring that the height of the principal point from the runway or taxiway is half the height of the imaging plane, the bottom edge of the imaging plane may be made to coincide with the surface of the runway or taxiway. This way, if a piece of FOD enters the field of view of the forward-facing camera, then its distance away from the forward-facing camera 21 may be greater than or equal to the distance between the forward-facing camera 21 and its respective imaging plane. This helps to reduce any elevation-wise motion blur in the captured images, just like how the limiting value helps to reduce any azimuth-wise motion blur in the captured images.

From the above, it will be appreciated that embodiments of the present invention provide means for carrying out a safe, fast and reliable FOD detection along a runway or taxiway-safe in that humans do not need perform in-person visual inspections of the runway or taxiway, and fast and reliable in that array 21 of vehicle 100 is arranged so as to minimise the number of sweeps performed, and minimise the motion blur captured in images taken, during the FOD detection process.

Further, it will be appreciated that while the preceding discussion has focussed on the runway/taxiway of an airport, vehicle 100 may additionally be suitable for detecting FOD disposed on other regions of the airport, such as aprons, hangars, stop-ways, and the like, for example. In such cases, rather than having the cumulative field of view (of the array of forward-facing cameras) span a width of a to-be-imaged part of the runway or taxiway, it may instead span a width of a to-be-imaged part of the apron, hangar or stop-way (when FOD is to be detected in such regions).

Additionally, it will be appreciated that while the preceding discussion has focussed on FOD detection, other types of detection are possible. For example, vehicle 100 may be used to detect ground lighting (such as cat's eyes) and surface cracks in the runway/taxiway/apron. By taking into account the length scale of FOD when arranging the array of forward-facing cameras 21, vehicle 100 would likely be also suitable for detecting ground lights and surface cracks, given that the length scale of FOD is likely to be smaller than that of ground lights and surface cracks.

Method

Turning now to FIGS. 6 and 7, method 200 of detecting foreign object debris disposed on a runway or taxiway comprises steps S201 to S206.

Step S201: obtaining vehicle 100 according to embodiment of the present invention. vehicle 100 has been described elsewhere herein, and so shall not be discussed here for brevity's sake.

Step S202: obtaining FOD detection circuitry 22. FOD detecting circuitry 22 has been described elsewhere herein, and so shall not be discussed here for brevity's sake.

It will be appreciated that in embodiments where vehicle 100 comprises FOD detection circuitry 22, steps S201 and S202 may be performed simultaneously.

Figure 9:
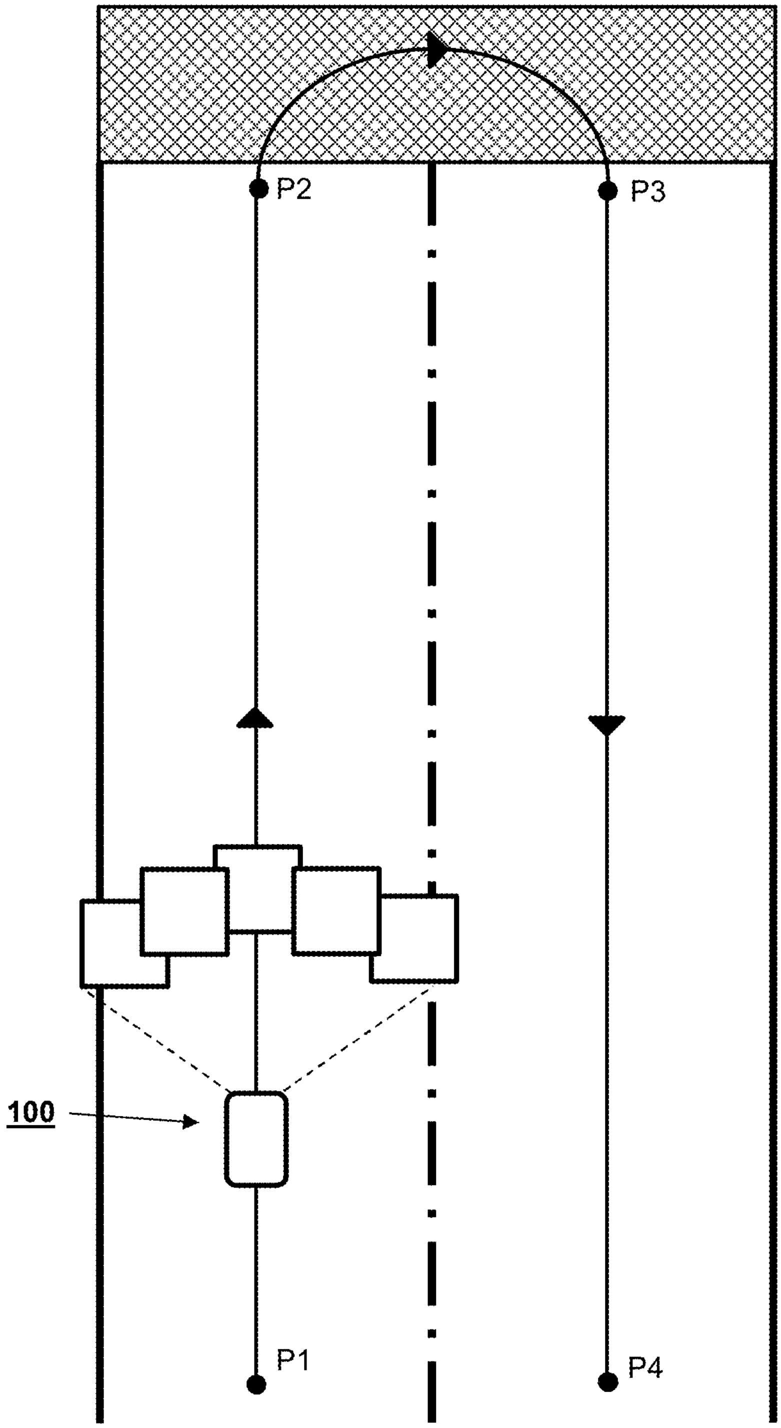
FIG. 9 schematically illustrates a method of detecting foreign object debris according to embodiments of the present invention.

Step S203: controlling vehicle 100 to travel along the runway or taxiway in a first forward direction from a first location to a second location. Step S203 is depicted in FIG. 9, where vehicle 100 travels along the runway or taxiway from first position P1 to second position P2. As mentioned previously, the vehicle may be remotely controlled by a human operator, or may be autonomously controlled.

Step S204: while vehicle 100 is travelling in the first forward direction, controlling each of the forward-facing cameras to capture images of the runway or taxiway and transmit the images to FOD detection circuitry 22. Step S204 is depicted in FIG. 9, with the white overlapping squares representing the cumulative field of view of array 21.

Step S205: controlling vehicle 100 to travel along the runway or taxiway in a second forward direction from a third location to a fourth location, the second forward direction being substantially opposite the first forward direction. As seen in FIG. 9, the path that vehicle 100 takes from third position P3 to fourth position P4 lies in substantially opposite direction to that taken from first position P1 to second position P2.

It will be appreciated that if second position P2 and third position P3 are not the same position, then vehicle 100 may be controlled to travel between second position P2 and third position P3. This is depicted in FIG. 9, where vehicle 100 may take an arcuate path through a stop-way/blast-pad of the runway or taxiway to arrive at third position P3. While travelling this arcuate path, the forward-facing cameras may optionally be controlled to stop capturing images of the runway or taxiway to reduce power consumption. Alternatively, the forward-facing cameras may continue to capture images for detecting FOD within the stop-way/blast-pad.

Step S206: while vehicle 100 is travelling in the second forward direction, controlling each of the forward-facing cameras to capture images of the runway or taxiway and transmit the images to FOD detection circuitry 202. This step is similar to step S205, albeit that vehicle 100 is travelling along a different path.

In method 200, vehicle 100 is made to perform at least two "sweeps" the runway or taxiway-a first sweep being when vehicle 100 travels in a first direction from P1 to P2 (a left half of the runway or taxiway, as viewed along the first direction, for example), and a second sweep being when vehicle 100 travels in a second direction (substantially opposite the first direction) from P3 to P4 (a right half of the runway or taxiway, as viewed along the first direction, for example). As mentioned previously, to perform method 200 with only two sweeps, the width of the to-be-imaged part of the runway or taxiway (that is, the total span of the cumulative field of view of array 21) may be greater than or equal to half of the width of the runway or taxiway (as depicted in FIG. 9). Should the total span be less than half of the width of the runway or taxiway, then additional sweeps may be required. For example, a third sweep may be used, in which vehicle 100 travels in the first direction from a fifth location to a sixth location, and so on. Method 200 may therefore be thought of as sending vehicle 100 up and down the runway or taxiway in a snaking pattern of two or more "sweeps" to image the runway or taxiway, the captured images being sent to FOD detection circuitry 22.

Preferably, the velocity of vehicle 100 may be greater than or equal to 40 kilometres per hour when travelling from the first location to the second location and when travelling from the third location to the fourth location. Put differently, steps S203 and S205 may comprise controlling vehicle 100 to travel at a velocity greater than or equal to 40 kilometres per hour. This way, carrying out method 200 may take less time than using a human inspector (such as airport staff), as mentioned previously.

More preferably, the velocity of vehicle 100 may be 60 kilometres per hour when travelling from the first location to the second location and when travelling from the third location to the fourth location. Put differently, steps S203 and S205 may comprise controlling vehicle 100 to travel at a velocity of 60 kilometres per hour. The inventors have found that this velocity provides an optimal balance between the speed and reliability of method 200, as mentioned previously.

Computer Program and Storage Medium

As mentioned previously, vehicle 100 may be remotely operated, or may be autonomously controlled. In the latter case, method 200 (or at least steps S203 to S206 thereof) may be carried out carried out on conventional hardware suitably adapted as applicable by software instruction (such as autonomous driving software) or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

CONCLUSION

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A vehicle for detecting foreign object debris (FOD) disposed on a surface of a runway or taxiway, the vehicle being configured to travel along the runway or taxiway in a forward direction and comprising an array of forward-facing cameras configured to capture images of the runway or taxiway and transmit the images to FOD detection circuitry, each forwarding-facing camera being a camera oriented such that a respective dot product arising between a camera's optical axis and the forward direction is greater than zero, the array being arranged such that, when in use:

a forward-facing cameras' fields of view combine to form a cumulative field of view which spans a width of a to-be-imaged part of the runway or taxiway, a respective azimuthal angle arising between each forward-facing camera's optical axis and the forward direction does not exceed a limiting value, the azimuthal angle between an extremal forward-facing camera's optical axis and the forward direction being equal to the limiting value, each forward-facing camera's imaging plane is positioned such that its displacement along the forward direction is at least a threshold distance away from its respective forward-facing camera, the threshold distance being determined based on the width of the to-be-imaged part of the runway or taxiway, and the limiting value, the limiting value being determined based on an extremal forward-facing camera's exposure time, a length scale of the FOD to be detected by the extremal forward-facing camera, a maximum tolerable amount of captured motion blur, and a velocity of the vehicle.

2. The vehicle according to claim 1, wherein the limiting value is determined based on the extremal forward-facing camera's field of view.

3. The vehicle according to claim 1, wherein the threshold distance is determined based on the extremal forward-facing camera's field of view.

4. The vehicle according to claim 1, wherein the limiting value is determined based on an extremal forward-facing camera's aperture size, and an illuminance of the FOD to be detected by the extremal forward-facing camera, and wherein the limiting value is determined based on the illuminance of the runway or taxiway.

5. The vehicle according to claim 1, wherein the array is arranged such that, when in use, a respective height of each forward-facing camera's principal point from the runway or taxiway is substantially half of a height of the forward-facing camera's imaging plane.

6. The vehicle according to claim 1, wherein each forward-facing camera is mounted to the vehicle such that the forward-facing camera's orientation with respect to the vehicle is rigidly fixed.

7. The vehicle according to claim 6, comprising one or more damping pads disposed between the forward-facing cameras and the vehicle.

8. The vehicle according to claim 1, wherein each forward-facing camera is a high-speed camera, and wherein an exposure time of at least one of the high-speed cameras is configurable within a predefined range of exposure times, and wherein a minimum exposure time of each high-speed camera does not exceed 0.001 seconds.

9. The vehicle according to claim 1, wherein a frame rate of at least one of the forward-facing cameras is configurable within a predefined range of frame rates, and wherein the frame rate of the at least one forward-facing camera is configured such that, while the foreign object debris lies within the forward-facing camera's field of view, the forward-facing camera captures at least three consecutive image frames depicting the foreign object debris.

10. The vehicle according to claim 1, wherein the length scale of the foreign object debris to be detected by the extremal forward-facing camera is greater than or equal to one centimetre.

11. The vehicle according to claim 1, wherein the maximum tolerable amount of captured motion blur represents a ratio of a maximum allowable intra-frame displacement of the foreign object debris and an intra-frame length scale of the foreign object debris, and wherein the ratio does not exceed 0.2.

12. The vehicle according to claim 1, wherein the width of the to-be-imaged part of the runway or taxiway is greater than or equal to half of the width of the runway or taxiway.

13. The vehicle according to claim 1, wherein, when in use, the vehicle's velocity is greater than or equal to 40 kilometres per hour.

14. The vehicle according to claim 1, wherein the threshold distance is greater than or equal to 10 metres.

15. The vehicle according to claim 1, comprising:

a set of driving cameras configured to capture images for unmanned driving of the vehicle; and one or more suspension systems coupled between the set of driving cameras and the vehicle.

16. The vehicle according to claim 1, wherein the vehicle is remotely operated or is autonomous.

17. The vehicle according to claim 1, comprising a set of forward-facing light emitting elements.

18. The vehicle according to claim 1, comprising the FOD detection circuitry.

19. A method of detecting foreign object debris (FOD) disposed on a runway or taxiway, comprising the steps of:

obtaining a vehicle according to claim 1;

obtaining FOD detection circuitry;

controlling the vehicle to travel along the runway or taxiway in a first forward direction from a first location to a second location;

while the vehicle is travelling in the first forward direction, controlling each of the forward-facing cameras to capture images of the runway or taxiway and transmit the images to the FOD detection circuitry;

controlling the vehicle to travel along the runway or taxiway in a second forward direction from a third location to a fourth location, the second forward direction being substantially opposite the first forward direction; and while the vehicle is travelling in the second forward direction, controlling each of the forward-facing cameras to capture images of the runway or taxiway and transmit the images to the FOD detection circuitry.

20. The method according to claim 19, wherein the vehicle's velocity is greater than or equal to 40 kilometres per hour when travelling from the first location to the second location and when travelling from the third location to the fourth location.

* * * * *